(12) United States Patent
Luo et al.

(10) Patent No.: US 8,269,843 B2
(45) Date of Patent: Sep. 18, 2012

(54) MOTION-COMPENSATION IMAGE PROCESSING APPARATUS, IMAGE PROCESSING METHOD, AND PROGRAM

(75) Inventors: Jun Luo, Tokyo (JP); Takefumi Nagumo, Kanagawa (JP); Yuhi Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 326 days.

(21) Appl. No.: 12/642,681

(22) Filed: Dec. 18, 2009

(65) Prior Publication Data

US 2010/0157072 A1    Jun. 24, 2010

(30) Foreign Application Priority Data

Dec. 22, 2008  (JP) ................... P2008-325421

(51) Int. Cl.
*H04N 5/228* (2006.01)
(52) U.S. Cl. ................................... 348/208.4
(58) Field of Classification Search ............... 348/208.4, 348/208.1, 208.6
See application file for complete search history.

(56) References Cited

U.S. PATENT DOCUMENTS

| | | | | |
|---|---|---|---|---|
| 8,036,488 B2* | 10/2011 | Nagumo | ................. | 382/275 |
| 2004/0252759 A1* | 12/2004 | John Winder et al. | ... | 375/240.12 |
| 2009/0092337 A1* | 4/2009 | Nagumo | ................. | 382/299 |
| 2009/0207260 A1* | 8/2009 | Furukawa | ................. | 348/208.4 |
| 2010/0124379 A1* | 5/2010 | Bruna et al. | ................. | 382/236 |
| 2010/0157073 A1* | 6/2010 | Kondo et al. | ............... | 348/208.4 |

FOREIGN PATENT DOCUMENTS

| | | |
|---|---|---|
| JP | 9-261526 | 10/1997 |
| JP | 10-150665 | 6/1998 |
| JP | 11-075105 | 3/1999 |
| JP | 2001-016594 | 1/2001 |
| JP | 2003-163894 | 6/2003 |
| JP | 2010147985 A * | 7/2010 |

* cited by examiner

*Primary Examiner* — Jason Chan
*Assistant Examiner* — Gary C Vieaux
(74) *Attorney, Agent, or Firm* — Finnegan Henderson Farabow Garrett & Dunner LLP

(57) ABSTRACT

An image processing apparatus includes: a section that detects a local motion vector for each block forming an image from a standard image and a reference image; a section that executes motion compensation on the reference image employing the local motion vector to generate a local motion-compensated image; a section that calculates a single global motion vector for the entire standard image and the entire reference image employing the local motion vector and that executes motion compensation on the reference image employing the global motion vector to generate a global motion-compensated image; and a section that calculates respective reliabilities of the local motion-compensated image and the global motion-compensated image in units of image regions and that executes a process to synthesize pixel values of the local motion-compensated image and pixel values of the global motion-compensated image in accordance with the reliabilities to generate a blended motion-compensated image.

10 Claims, 16 Drawing Sheets

(TOTAL NUMBER OF BLOCKS = p, NUMBER OF BLOCKS UTILIZED = q)

| 1.0 | 1.0 | 1.0 | 0.3 | 0.3 |
| --- | --- | --- | --- | --- |
| 0.5 | 0.5 | 0.5 | 0.3 | 0.3 |
| 1.0 | 1.0 | 1.0 | 0.1 | 0.1 |
| 1.0 | 1.0 | 1.0 | 0.1 | 0.1 |

FIG. 10

|  | (a) Var (neighboring LMV) > T5 | (b) Var (neighboring LMV) ≤ T5 |
|---|---|---|
| (1) \|LMV−GMV\| > T4 | LMC RELIABILITY = LOW | LMC RELIABILITY = LOW |
| (2) \|LMV−GMV\| > T4 | LMC RELIABILITY = LOW | LMC RELIABILITY = HIGH |

PIXEL VALUE OF CENTER PIXEL: [PixelValue] = 1/9 Σ PixelValue

MOTION-COMPENSATION IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program. More specifically, the present invention relates to an image processing apparatus, an image processing method, and a program that execute a process for generating a motion-compensated image and reducing the noise of an image.

2. Description of the Related Art

An image captured by an imaging device such as a camera or a video camera, for example, includes considerable noise. In particular, an image captured under low illumination or with a short exposure time often includes much noise. This is because the amount of incident light is so small as to reduce the amount of charge stored in an imaging element in the case where an image is captured under low illumination or with a short exposure time. In order to obtain a bright image on the basis of captured data, it is necessary to amplify a signal for the data. While amplifying the signal, noise produced in an imaging element or an analog circuit is also amplified, resulting in an image with much noise.

In order to reduce noise, it is effective to capture an image with a long exposure time. Capturing an image with a long exposure time, however, may cause halation in the image due to hand-shake during exposure. Another approach is to continuously capture images with high shutter speeds that cause substantially no halation due to exposure to obtain an average of the plurality of images captured continuously, reducing noise uncorrelated with time. In this approach, however, the resulting image may be blurred because of camera movement due to hand-shake or a moving subject, or a moving subject may be captured as if captured through multiple exposure, degrading the image.

Examples of techniques for reducing noise in an image according to the related art include:

Japanese Unexamined Patent Application Publication No. Hei 09-261526 (JP-A-Hei 09-261526) discloses a technique to superimpose a plurality of images captured continuously while correcting hand-shake.

Japanese Unexamined Patent Application Publication No. Hei 11-75105 (JP-A-Hei 11-75105) discloses a technique to divide the total exposure time into a plurality of exposure times and add images obtained in the respective exposure times to improve the image quality.

Both the techniques disclosed in JP-A-Hei 09-261526 and JP-A-Hei 11-75105 include detecting a motion vector from a plurality of images to obtain information on motion between the plurality of images and utilizing the motion information to synthesize the images. However, in the case where the images to be processed include subjects with different motions or include a low-contrast image, for example, it may be difficult to detect a motion vector and to correctly correlate the respective motions of the subjects and the motion vector detected from the images. Consequently, the image synthesis process may be performed employing a motion vector with a low precision, degrading the noise reduction effect.

SUMMARY OF THE INVENTION

In view of the foregoing, it is desirable to provide an image processing apparatus, an image processing method, and a program that synthesize a plurality of images employing an optimum motion vector to generate a high-quality noise-reduced image.

According to a first embodiment of the present invention, there is provided an image processing apparatus including: a local motion estimation processing section that detects a local motion vector for each block forming an image from a standard image and a reference image; a motion compensation processing section that executes motion compensation on the reference image employing the local motion vector to generate a local motion-compensated image; a global motion compensation processing section that calculates a single global motion vector for the entire standard image and the entire reference image employing the local motion vector and that executes motion compensation on the reference image employing the calculated global motion vector to generate a global motion-compensated image; and a blend processing section that calculates respective reliabilities of the local motion-compensated image and the global motion-compensated image in units of image regions and that executes a process to synthesize pixel values of the local motion-compensated image and pixel values of the global motion-compensated image in accordance with the calculated reliabilities to generate a blended motion-compensated image.

In the image processing apparatus according to the embodiment of the present invention, the blend processing section may include a local motion-compensated image reliability judgment processing section that calculates the reliability of the local motion-compensated image, and the local motion-compensated image reliability judgment processing section may be configured to calculate the reliability of the local motion-compensated image in units of blocks by calculating at least one of: (a) a difference between the local motion vector and the global motion vector; (b) a variance of the local motion vector; and (c) a variance of pixel values of pixels in a block of the local motion-compensated image.

In the image processing apparatus according to the embodiment of the present invention, the blend processing section may include a global motion-compensated image reliability judgment processing section that calculates the reliability of the global motion-compensated image, and the global motion-compensated image reliability judgment processing section may be configured to calculate the reliability of the global motion-compensated image in units of pixels or predetermined regions by calculating at least one of: (a) an absolute difference between pixels forming the local motion-compensated image and pixels forming the global motion-compensated image; (b) a difference between normalized correlation between pixels forming the standard image and the pixels forming the local motion-compensated image and normalized correlation between the pixels forming the standard image and the pixels forming the global motion-compensated image; and (c) a difference between a sum of absolute difference between the pixels forming the standard image and the pixels forming the local motion-compensated image for each predetermined region and a sum of absolute difference between the pixels forming the standard image and the pixels forming the global motion-compensated image for each predetermined region.

In the image processing apparatus according to the embodiment of the present invention, the blend processing section may include a blend ratio determination section that determines a blend ratio to be employed in the process to synthesize the pixel values of the local motion-compensated image and the pixel values of the global motion-compensated image, and the blend ratio determination section may be configured to: for pixels for which it is determined that the reliability of the global motion-compensated image is low, set the blend ratio of the global motion-compensated image to 0; for pixels for which it is determined that the reliability of the global motion-compensated image is high and that the reliability of the local motion-compensated image is low, set the blend ratio of the global motion-compensated image to be relatively high; and for pixels for which it is determined that the reliability of the global motion-compensated image is high and that the reliability of the local motion-compensated image is high, set the blend ratio of the global motion-compensated image to be relatively low.

In the image processing apparatus according to the embodiment of the present invention, the blend processing section may include a boundary processing section that adjusts the blend ratio determined by the blend ratio determination section, and the boundary processing section may be configured to calculate a blend ratio corresponding to pixel values calculated through a pixel value smoothening process in which a low-pass filter is applied to pixel values calculated in accordance with the blend ratio determined by the blend ratio determination section.

In the image processing apparatus according to the embodiment of the present invention, the blend processing section may include a blended motion-compensated image generation section that executes the process to synthesize the pixel values of the local motion-compensated image and the pixel values of the global motion-compensated image in accordance with the blend ratio calculated by the boundary processing section to generate the blended motion-compensated image.

In the image processing apparatus according to the embodiment of the present invention, the image processing apparatus may further include an addition processing section that performs a process to add the standard image and the blended motion-compensated image to generate a noise-reduced image in which noise deriving from the standard image has been reduced.

In the image processing apparatus according to the embodiment of the present invention, the image processing apparatus may further include an addition determination section that sets a weight of the blended motion-compensated image for use in the addition process executed by the addition processing section.

With the configuration according to an embodiment of the present invention, a local motion-compensated image is generated employing a local motion vector which represents motion between a standard image and a reference image for each block, and a global motion-compensated image is generated employing a global motion vector which represents motion between the entire standard image and the entire reference image. The respective reliabilities of the local motion-compensated image and the global motion-compensated image are calculated in units of image regions, and the pixel values of the local motion-compensated image and the pixel values of the global motion-compensated image are synthesized in accordance with the calculated reliabilities to generate a blended motion-compensated image. The blended motion-compensated image and the standard image are added to generate a noise-reduced image. The configuration makes it possible to generate a blended motion-compensated image with optimum pixel values in accordance with the respective reliabilities of the local motion-compensated image and the global motion-compensated image. The configuration further makes it possible to generate a high-quality noise-reduced image.

According to a second embodiment of the present invention, there is provided an image processing method for an image processing apparatus to execute image processing, including the steps of: a local motion estimation processing section detecting a local motion vector for each block forming an image from a standard image and a reference image; a motion compensation processing section executing motion compensation on the reference image employing the local motion vector to generate a local motion-compensated image; a global motion compensation processing section calculating a single global motion vector for the entire standard image and the entire reference image employing the local motion vector and executing motion compensation on the reference image employing the calculated global motion vector to generate a global motion-compensated image; and a blend processing section calculating reliabilities of the local motion-compensated image and the global motion-compensated image in units of image regions and executing a process to synthesize pixel values of the local motion-compensated image and pixel values of the global motion-compensated image in accordance with the calculated reliabilities to generate a blended motion-compensated image.

According to a third embodiment of the present invention, there is provided a program for causing an image processing apparatus to execute image processing, including the steps of: causing a local motion estimation processing section to detect a local motion vector for each block forming an image from a standard image and a reference image; causing a motion compensation processing section to execute motion compensation on the reference image employing the local motion vector to generate a local motion-compensated image; causing a global motion compensation processing section to calculate a single global motion vector for the entire standard image and the entire reference image employing the local motion vector and execute motion compensation on the reference image employing the calculated global motion vector to generate a global motion-compensated image; and causing a blend processing section to calculate reliabilities of the local motion-compensated image and the global motion-compensated image in units of image regions and execute a process to synthesize pixel values of the local motion-compensated image and pixel values of the global motion-compensated image in accordance with the calculated reliabilities to generate a blended motion-compensated image.

An embodiment of the present invention provides a computer program that is in a computer-readable format and that is distributable to general-purpose computer systems capable of executing various program codes, for example, through a storage medium or a communication medium. Providing such a program in a computer-readable format allows computer systems to perform processes in accordance with the program.

Further objects, characteristics, and advantages of the present invention will become apparent upon reading the following detailed description of embodiments of the present invention given with reference to the accompanying drawings. The term "system" as used herein refers to a logically integrated set of a plurality devices, and is not limited to a plurality devices accommodated in the same housing.

BRIEF DESCRIPTION OF THE DRAWINGS

FIG. 10 illustrates an exemplary process for judging the reliability performed by the LMC image reliability judgment processing section;

DESCRIPTION OF THE PREFERRED EMBODIMENTS

An image processing apparatus, an image processing method, and a program according to an embodiment of the present invention will be described below in detail with reference to the drawings. The embodiment of the present invention is described below sequentially in the following order:

(1) Overview of Process for Generating Noise-Reduced Image (2) Local Motion Vector (LMV) and Global Motion Vector (GMV)

Figure 1:
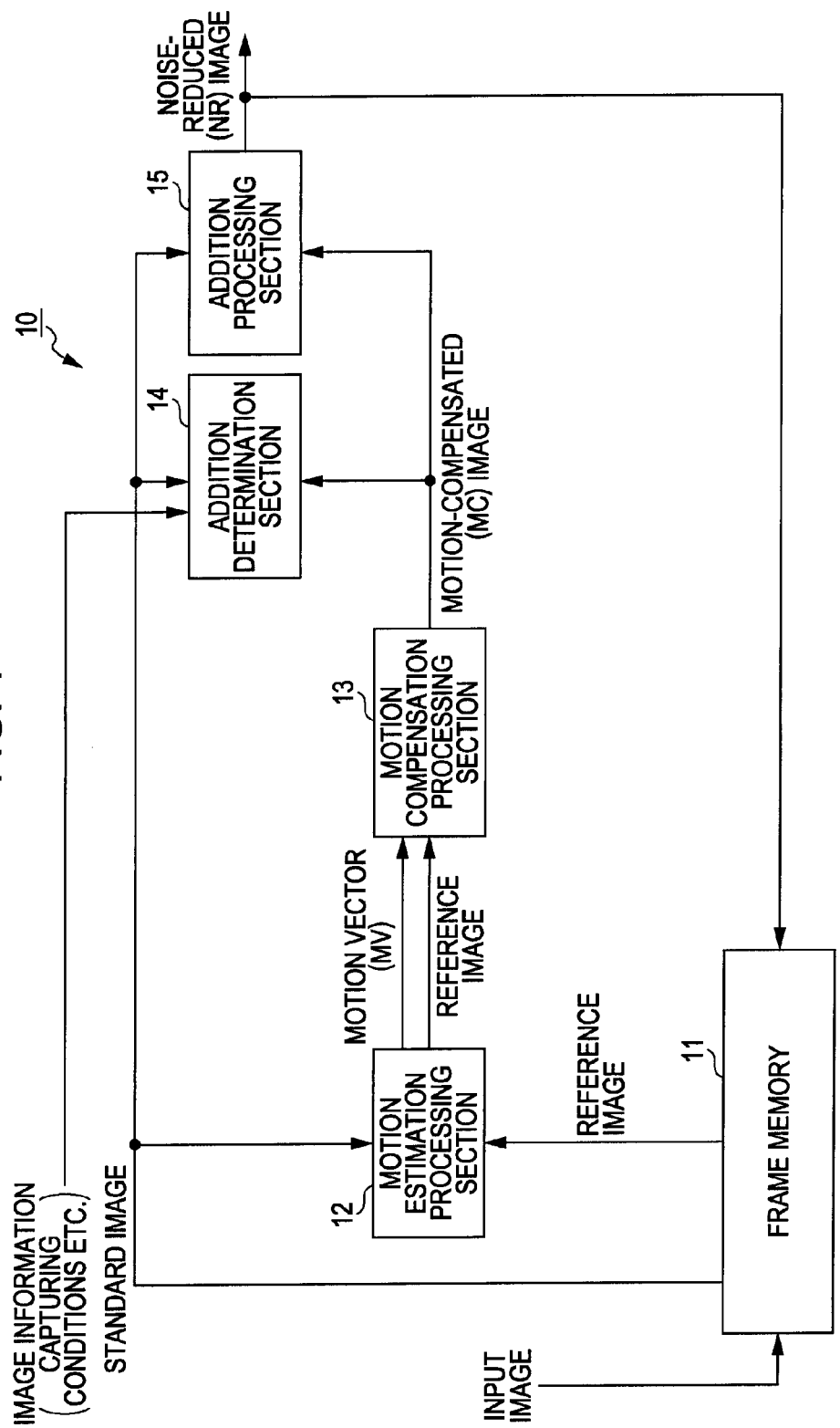
FIG. 1 illustrates an exemplary configuration of an image processing apparatus that performs a process for generating a noise-reduced image.

(3) Exemplary Image Processing Utilizing Blended Motion-Compensated (BMC) Image (4) Exemplary Hardware Configuration of Image Processing Apparatuse (1) Overview of Process for Generating Noise-Reduced Image First, an overview of a process for generating a noise-reduced image through an image synthesis process employing a plurality of images is described before describing an image processing apparatus according to an embodiment of the present invention. FIG. 1 shows an image processing apparatus with a configuration substantially identical to the configuration of the image processing apparatus disclosed in Japanese Patent Application No. 2007-136184 filed earlier by the same applicant as the present applicant.

An overview of the process for generating a noise-reduced image through an image synthesis process employing a plurality of images is described in accordance with the configuration disclosed in the earlier application. An image processing apparatus 10 shown in FIG. 1 may be implemented as an independent image processing apparatus, or may be implemented as an internal constituent element of a camera, a PC, or an image display apparatus, for example.

In the description below, the image processing apparatus 10 shown in FIG. 1 is provided in a camera, and images are continuously captured and sequentially stored as input images in a frame memory 11. The image processing apparatus 10 includes a frame memory 11, a motion estimation processing section 12, a motion compensation processing section 13, an addition determination section 14, and an addition processing section 15. The frame memory 11 sequentially stores captured images as input images.

The input images contain noise. The image processing apparatus 10 shown in FIG. 1 reduces noise in the input images, and finally outputs a noise-reduced image (NR image) as an output of the addition processing section 15 shown in FIG. 1.

The motion estimation processing section 12 receives a standard image and a reference image from the frame memory 11. The standard image is a target of a noise reduction process. The reference image is employed in the noise reduction process performed on the standard image. A motion vector is obtained from the standard image and the reference image, for example. The noise reduction process performed on the standard image is performed by employing a plurality of continuously captured reference images.

For example, one standard image and one reference image are employed to generate an NR image, which is stored in the frame memory 11 as a new standard image. A further noise reduction process is then performed on the new standard image employing a subsequent, second reference image. A specific exemplary process will be described in subsequent paragraphs with reference to FIG. 2.

The motion estimation processing section 12 calculates a motion vector employing the standard image and the reference image from the frame memory 11. For example, blocks in the reference image and corresponding blocks in the standard image are aligned with each other in units of small regions (blocks) defined by partitioning each image frame, for example, to output a motion vector MV for each block. The motion vector MV indicates image motion between the standard image and the reference image. The motion vector may contain information on not only translation but also enlargement/reduction, rotation, and so forth.

A block matching method, for example, may be employed to detect the motion vector MV. The block matching method includes dividing each small region (block) mentioned above into microblocks, calculating an absolute difference (AD) between pixel values of the standard image and the reference image for each microblock, and estimating a set of microblocks with a small AD as corresponding blocks. A vector connecting the corresponding blocks in the two images is determined as a motion vector.

The motion compensation processing section 13 performs motion compensation on the standard image or the reference image employing the motion vector MV generated by the motion estimation processing section 12 to generate a motion-compensated (MC) image. Specifically, in the generated MC image, the standard image or the reference image has been moved to match the position of a subject in the standard image with the position of the subject in the reference image. The MC image generated by the motion compensation processing section 13 is supplied to the addition determination section 14 and the addition processing section 15.

The addition determination section 14 receives the MC image generated by the motion compensation processing section 13, the standard image, and image information for use in noise amount estimation (such as capturing conditions). The image information may be supplied from a microcomputer in a camera, for example. The image information includes the capturing mode, exposure time, gain, and so forth corresponding to the input images (captured images).

The addition determination section 14 generates an addition weight for use by the addition processing section 15 in units of pixels. The addition weight indicates the reliability of an addition. That is, the addition determination section 14 determines the accuracy of the motion compensation performed between the standard image and the MC image, and determines the reliability of the MC image for pixels that reduce noise without causing degradation when the standard image and the MC image are added to be high.

That is, the addition determination section 14 determines the accuracy of the motion compensation performed between the standard image and the MC image, and calculates the addition weight such that the addition ratio of the MC image is higher for pixels with accurate motion compensation and hence with high reliability. The addition determination section 14 determines the addition weight in units of pixels of the MC image.

It is possible to reduce noise uncorrelated with time, for example, by adding pixels obtained by capturing an identical portion of an identical object of two images captured at different times. Thus, as the certainty of the correspondence of the identical portion of the identical object of the two images is higher, the reliability is higher. In other words, the reliability indicates whether noise is superimposed on identical images or on different images, and it is necessary, for a high-precision noise reduction process, that the addition weight be provided in as much correspondence to the amount of noise as possible. The addition weight generated by the addition determination section 14 is set to a value of 0 when the reliability is low and to a value of 1 when the reliability is high, for example.

The addition processing section 15 performs a process to add the standard image and the MC image employing the addition weight calculated for each corresponding pixel. The addition processing section 15 performs the addition process by calculating a weighted average between the standard image and the MC image. The weight in the weighted average is a value obtained by multiplying the addition weight by a feedback rate. If the feedback rate is set to 1/3, for example, the weight of the MC image in the weighted average varies in the range of 0 to 1/3 as the addition weight varies in the range of 0 to 1.

The results of the addition of the standard image and the MC image generated by the addition processing section 15 are stored in the frame memory 11. The thus obtained image is used as a new standard image and combined with a new reference image so that the same process as discussed above is performed repeatedly. After the process is performed a prescribed number of times, for example, the results of the addition of the standard image and the MC image generated by the addition processing section 15 are output as an NR image.

A specific exemplary process in which the image processing apparatus shown in FIG. 1 is employed is described with reference to FIG. 2. The four images shown in the uppermost row of FIG. 2, namely a standard image a and reference images A to C, are continuously captured by a camera. In terms of time, the standard image a is captured first, and is sequentially followed by the reference images A to C. Although the standard image is captured first and the reference images are captured subsequently in the example shown in FIG. 2, the capturing order may be reversed, that is, the reference images may be a plurality of images captured first and the standard image may be an image captured subsequently.

Figure 2:
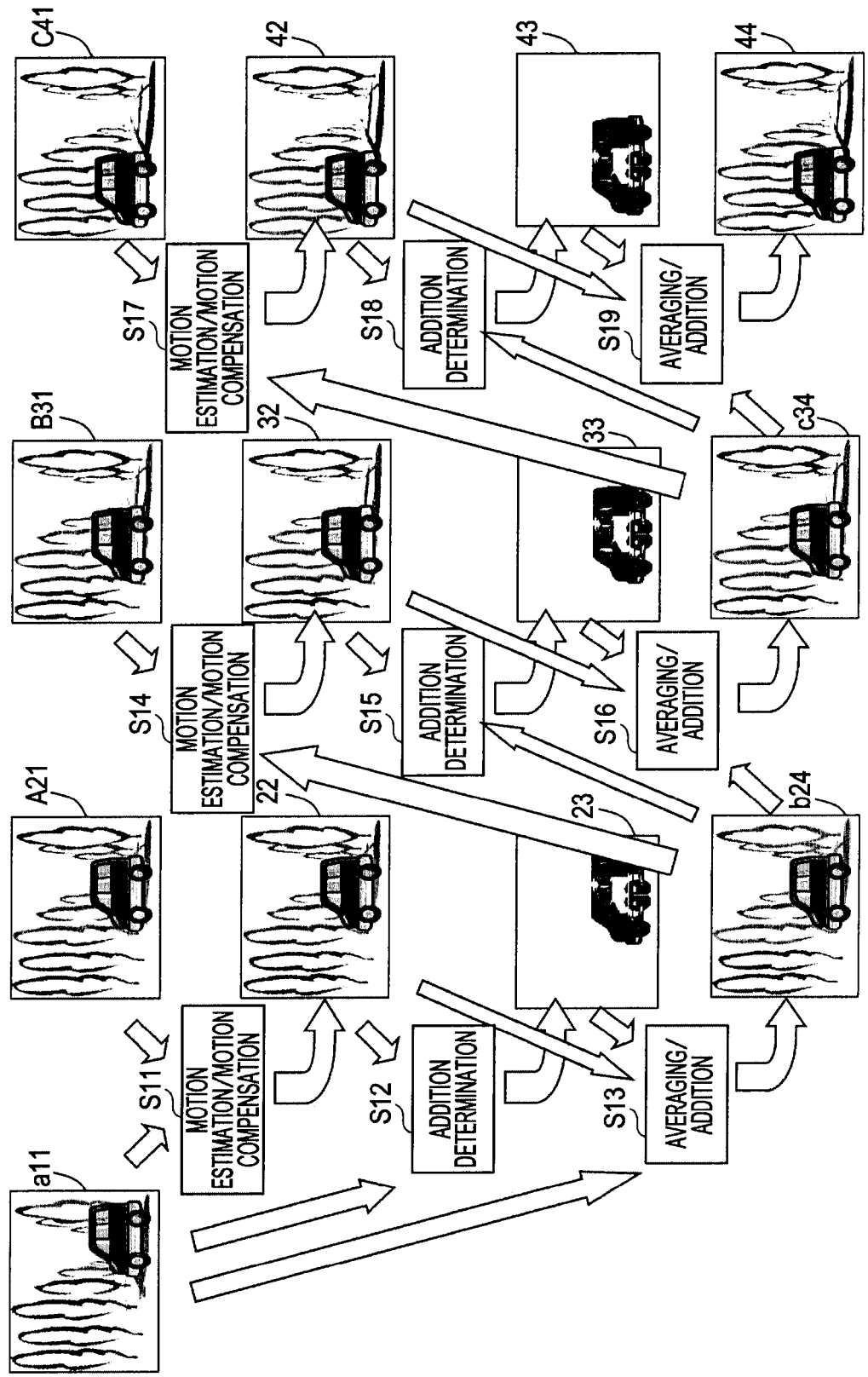
FIG. 2 illustrates an exemplary process for generating a noise-reduced image.

In the example shown in FIG. 2, first, a standard image a11 and a reference image A21 captured next are processed.

In step S11, the standard image a11 and the reference image A21 are employed to calculate a motion vector MV, and the calculated motion vector MV is employed to generate an MC image.

For example, blocks in the reference image A21 and corresponding blocks in the standard image a11 are aligned with each other to generate a motion vector MV for each block. The process is performed by the motion estimation processing section 12 shown in FIG. 1. The motion estimation processing section 12 acquires the standard image a11 and the reference image A21 from the frame memory 11 to execute the process. Then, the motion compensation processing section 13 performs motion compensation on the reference image employing the motion vector MV to generate an MC image 22.

Then, in step S12, the standard image a11 and the MC image 22 are compared to perform an addition determination process to calculate an addition weight which indicates the reliability of the addition for each pixel. That is, the accuracy of the motion compensation performed between the standard image and the MC image is determined to calculate the addition weight such that the addition ratio of the MC image 22 is higher for pixels with accurate motion compensation and hence with high reliability. An addition determination map 23 in which the weight value is indicated in units of pixels is shown in FIG. 2. The process in step S12 is executed by the addition determination section 14 shown in FIG. 1.

Then, in step S13, the standard image a11 and the MC image 22 are added employing the addition weight calculated for each corresponding pixel (the addition determination map 23). The process is executed by the addition processing section 15 shown in FIG. 1. The image generated by the addition process (standard image+MC image) is a standard image b24 shown in the lowermost row of FIG. 2.

The standard image b24 is stored in the frame memory 11. The standard image b24 is combined with a reference image B31, which is captured directly after the reference image A21, to be processed in steps S14 to S16. The processes in steps S14 to S16 are the same as the processes in steps S11 to S13.

That is, in step S14, the standard image b24 and the reference image B31 are employed to generate an MC image 32.

In step S15, the standard image b24 and the MC image 32 are employed to generate an addition determination map 33.

In step S16, the standard image b24 and the MC image 32 are added employing the addition determination map 33 to generate a standard image c34 (standard image+MC image).

The standard image c34 is stored in the frame memory 11. The standard image b34 is combined with a reference image C41, which is captured directly after the reference image B31, to be processed in steps S17 to S19. The processes in steps S17 to S19 are also the same as the processes in steps S11 to S13.

That is, in step S17, the standard image c34 and the reference image C41 are employed to generate an MC image 42.

In step S18, the standard image c34 and the MC image 42 are employed to generate an addition determination map 43.

In step S19, the standard image c34 and the MC image 42 are added employing the addition determination map 43 to generate an NR image 44.

Although the three reference images A to C are employed to generate the NR image 44 in the exemplary process shown in FIG. 2, this is merely illustrative, and a greater number of reference images may be repeatedly employed to repeat the same processes as the processes in steps S11 to S13.

Figure 3:
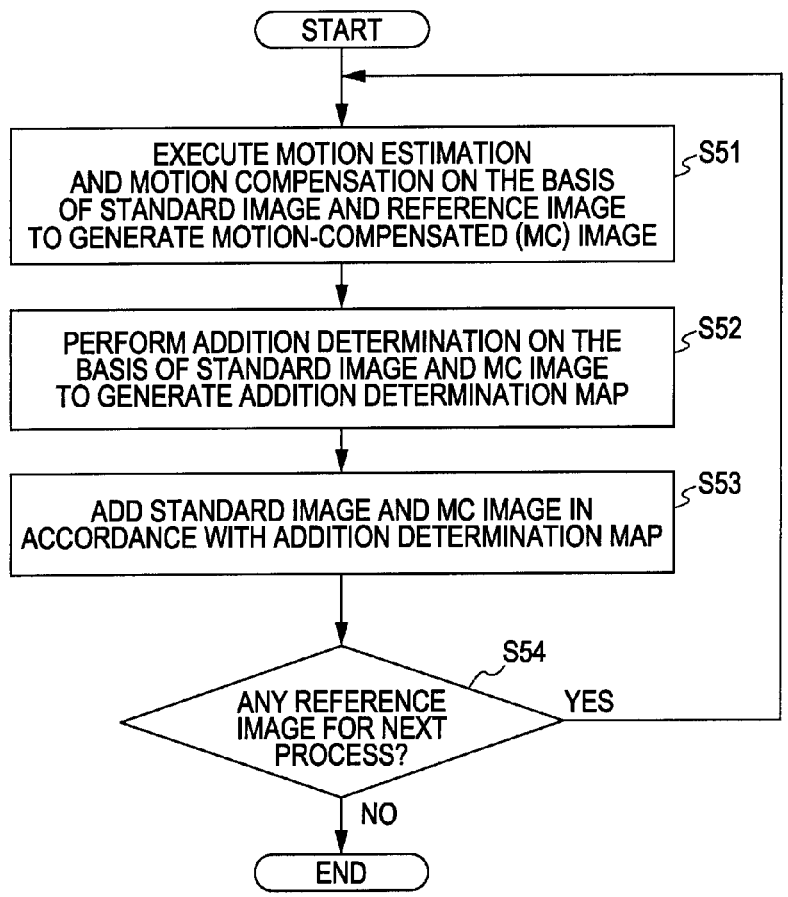
FIG. 3 is a flowchart illustrating the sequence of the process for generating a noise-reduced image.

The sequence of a process for generating an NR image executed by the image processing apparatus shown in FIG. 1 is described with reference to the flowchart shown in FIG. 3. The processes in steps S51 to S53 of the flowchart shown in FIG. 3 respectively correspond to the processes in steps S11 to S13 shown in FIG. 2.

First, in step S51, a standard image and a reference image are employed to calculate a motion vector MV, and the calculated motion vector MV is employed to generate an MC image through a motion compensation process performed on the reference image.

Then, in step S52, the standard image and the MC image are compared to perform an addition determination process to calculate an addition weight which indicates the reliability of the addition for each pixel, generating an addition determination map.

Then, in step S53, the standard image and the MC image are added for each corresponding pixel in accordance with the addition determination map. The addition process results in generation of a standard image or an NR image equivalent to standard image+MC image shown in FIG. 2.

After step S53, the process proceeds to step S54. In step S54, it is determined whether or not an additional reference image for further processing is available. The term "additional reference image for further processing" refers to an image which is captured at a different timing and in which the same subject as the subject of the standard image is captured, for example. Specifically, the additional reference image for further processing may be images captured continuously, for example. If an additional reference image for further processing is available, the process returns to step S51, and the processes in steps S51 to S53 are performed again employing the reference image and the standard image equivalent to standard image+MC image generated in step S53.

If it is determined in step S54 that no additional reference image for further processing is available, the image generated as a result of the addition in step S53 is finally output as an NR image.

(2) Local Motion Vector (LMV) and Global Motion Vector (GMV)

In the process for generating an NR image described with reference to FIGS. 1 to 3, the motion estimation processing section 12 shown in FIG. 1 detects a motion vector on the basis of a standard image and a reference image, and outputs the detected motion vector to the motion compensation processing section 13. The motion compensation processing section 13 employs the motion vector to generate an MC image.

The motion vector calculation process executed by the motion estimation processing section 12 may be performed in a plurality of ways. In the above description, an image is partitioned into small regions (blocks) to calculate a motion vector for each block. Examples of the motion vector calculation technique include a technique in which a motion vector is calculated for each block as described above and a technique in which a single motion vector is calculated for an image on the basis of motion of the entire image.

Figure 4:
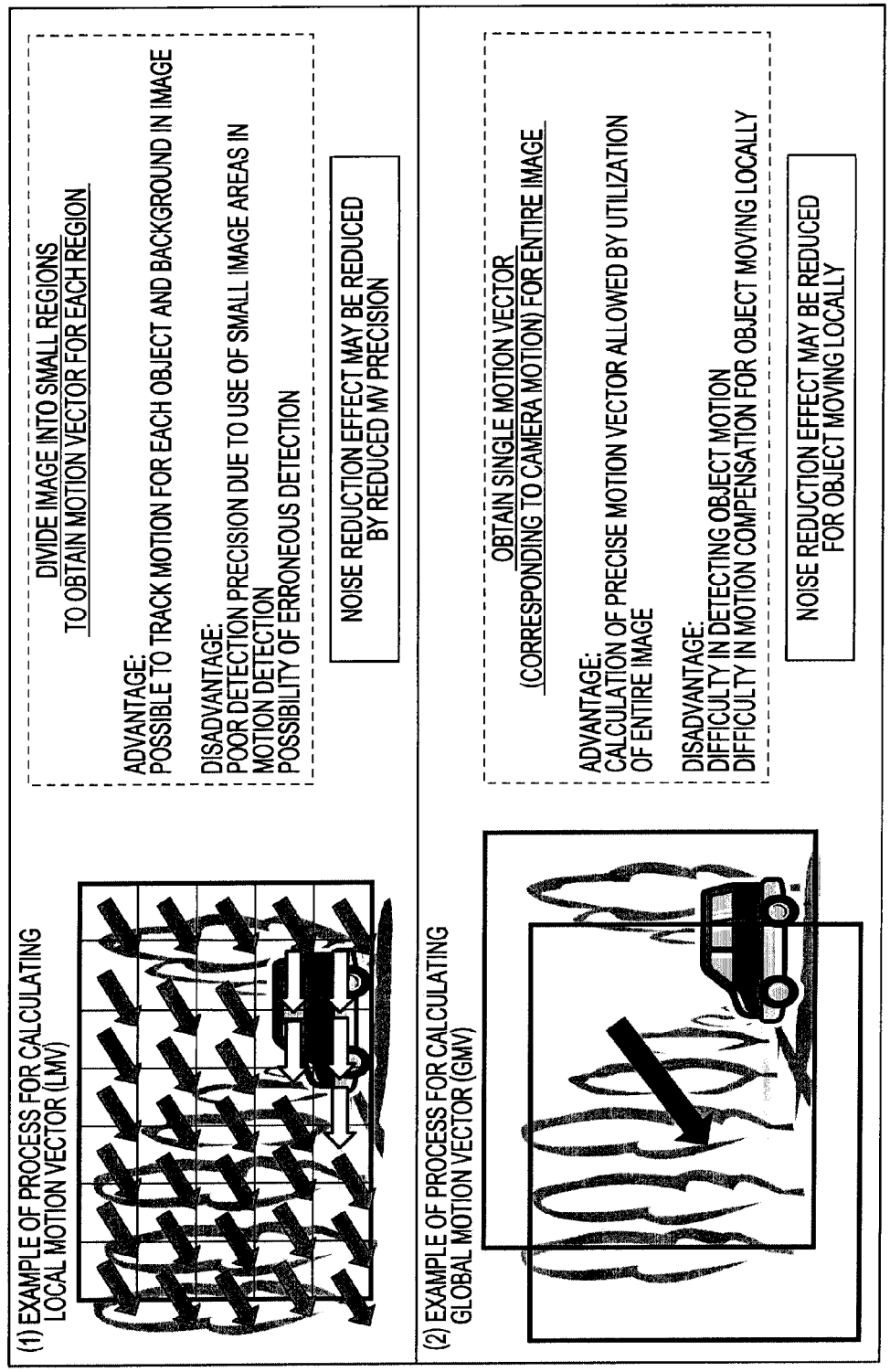
FIG. 4 illustrates an exemplary process for calculating a local motion vector (LMV) and a global motion vector (GMV)

A specific exemplary process is described with reference to FIG. 4. FIG. 4 shows two examples of the motion vector calculation process:

(1) an example of a calculation process for a local motion vector (LMV); and (2) an example of a calculation process for a global motion vector (GMV).

In the LMV calculation process (1), an image is divided into small regions (blocks) to obtain motion for each region so as to perform processing in units of regions using a motion vector for each region. The motion vector MV employed in the process described with reference to FIGS. 1 to 3 corresponds to the LMV.

An advantage of the LMV calculation process is that it is possible to perform processing in correspondence with motions of individual objects in the image and the background of the image.

On the other hand, a disadvantage of the LMV calculation process is that the detection precision may be poor because the image area used to detect motions corresponding to LMVs for individual blocks is small.

In detecting a motion vector MV, as described earlier, an AD between pixel values for each microblock is calculated, and a set of microblocks with a small AD is estimated as corresponding blocks. However, in the case where a plurality of sets of microblocks have generally the same AD, it may be difficult to select one set of microblocks.

In the case where an MC image is generated employing an LMV, the following problems in the image quality may occur:

(1) The generated MC image may include visually recognizable boundaries between blocks.

(2) A flat portion or a periodic-pattern portion may involve spatial unnaturalness in units of blocks.

(3) A fine texture in the background may be lost.

In the GMV calculation process (2), meanwhile, only one motion vector for the entire image is obtained for one image. The motion vector corresponds to camera motion, for example.

An advantage of the GMV calculation process is that it is possible to calculate a high-precision motion vector since the process utilizes the entire image.

On the other hand, a disadvantage is that object motion specific to an object in an image may not be detected. Another disadvantage is that motion compensation may not be performed on an object moving locally since the process does not employ a motion vector corresponding to such an object.

As described above, both the process employing an LMV and the process employing a GMV have disadvantages.

(3) Exemplary Image Processing Utilizing Blended Motion-Compensated (BMC) Image

An image processing apparatus according to an embodiment of the present invention employs both an LMV and a GMV. Two motion-compensated images generated utilizing the two motion vectors are selectively used appropriately in accordance with the image region, or synthesized, to form a blended motion-compensated (BMC) image.

In the description below, the following terms are used:

local motion-compensated (LMC) image, which refers to a motion-compensated image generated employing an LMV;

global motion-compensated (GMC) image, which refers to a motion-compensated image generated employing a GMV; and blended motion-compensated (BMC) image, which refers to an image obtained by synthesizing (blending) an LMC image and a GMC image.

In the image processing apparatus according to the embodiment of the present invention, first, an LMC image and a GMC image are generated employing an LMV and a GMV, respectively. Then, the two motion-compensated images are synthesized in units of image regions to generate a BMC image.

Specifically, a BMC image includes the following motion-compensated images in accordance with the image region:

(a) For an image region with motion different from the camera motion (=motion of the entire image), an LMC image to which an LMV has been applied is output.

(b) For an image region with motion approximate to the camera motion (=motion of the entire image), one of the following processes is performed depending on whether the image region corresponds to a flat portion or a periodic pattern, or an edge or a texture portion.

(b1) For an image region corresponding to a flat portion or a periodic pattern, a GMC image to which a GMV has been applied is basically output.

In some cases, however, a motion-compensated image obtained by synthesizing (blending) an LMC image and a GMC image is output. In such cases, the blend ratio of the GMC image is set to be greater than the blend ratio of the LMC image.

(b2) For an image region corresponding to an edge or a texture portion, an LMC image to which an LMV has been applied is basically output.

In some cases, however, a motion-compensated image obtained by synthesizing (blending) an LMC image and a GMC image is output. In such cases, the blend ratio of the LMC image is set to be greater than the blend ratio of the GMC image.

In the image processing according to the embodiment of the present invention, as described above, the motion-compensated image to be output is one of an LMC image, a GMC image, and a motion-compensated image obtained by blending the two images in accordance with the image region. Thus, the different types of motion-compensated images are mixed in units of image regions in the generated image.

As a result of the process described above, connection at the boundary between the image regions may be unnatural. For example, the pixel values may be significantly different at the boundary between the image regions. In order to eliminate the unnaturalness of the connection between the image regions, the image processing apparatus according to the embodiment of the present invention performs blend ratio adjustment and so forth to generate a final motion-compensated image.

Figure 5:
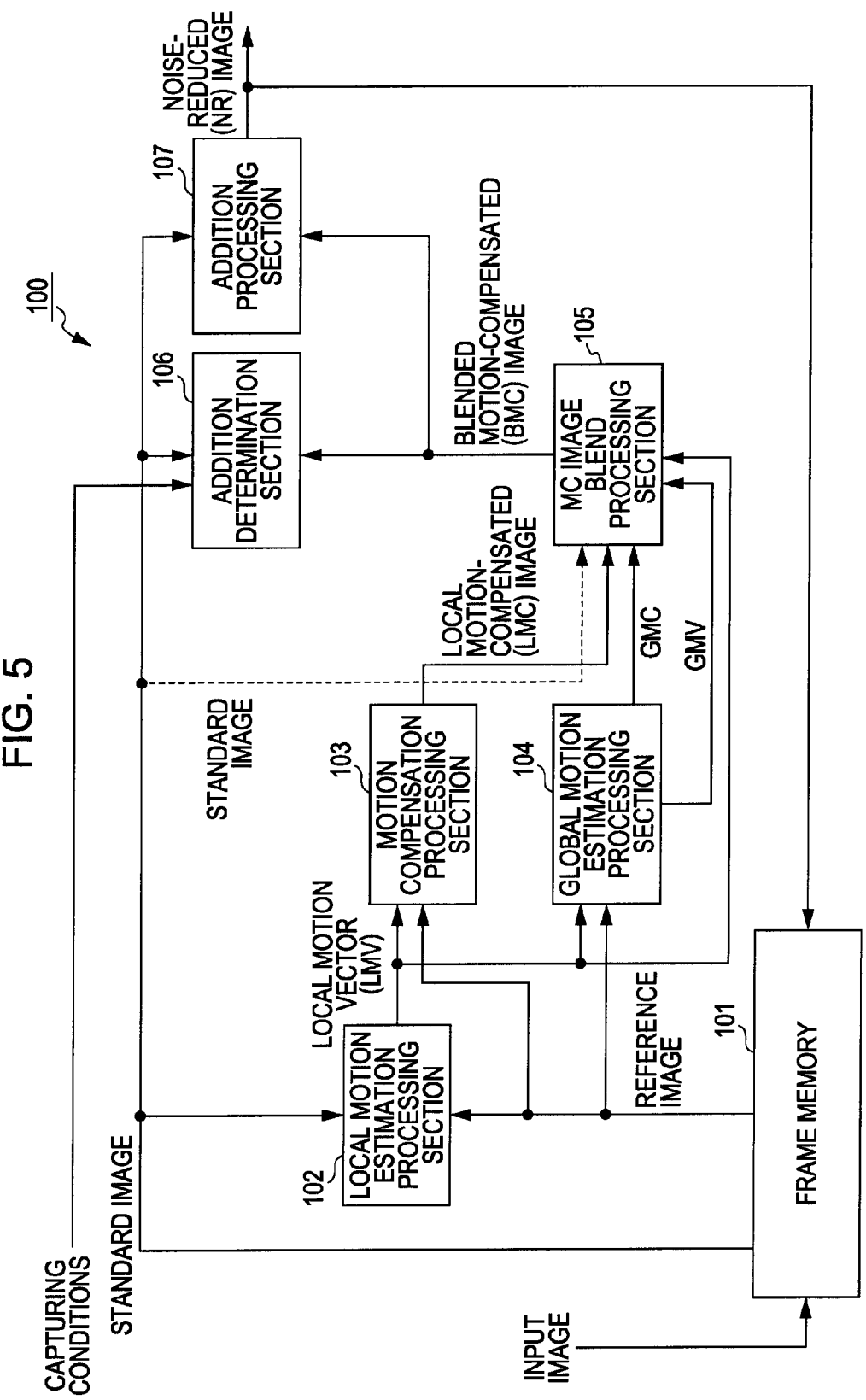
FIG. 5 illustrates an exemplary configuration of an image processing apparatus according to an embodiment of the present invention.

An exemplary configuration of the image processing apparatus according to the embodiment of the present invention is shown in FIG. 5. An image processing apparatus 100 shown in FIG. 5 may be implemented as an independent image processing apparatus, or may be implemented as an internal constituent element of a camera, a PC, or an image display apparatus, for example.

In the case where the image processing apparatus 100 shown in FIG. 5 is provided in a camera, images are sequentially captured and continuously stored in a frame memory 101 as input images. The image processing apparatus 100 includes a frame memory 101, a local motion estimation processing section 102, a motion compensation processing section 103, a global motion estimation processing section 104, a motion-compensated (MC) image blend processing section 105, an addition determination section 106, and an addition processing section 107. The frame memory 101 sequentially stores captured images as input images.

The input images contain noise. The image processing apparatus 100 shown in FIG. 5 reduces noise in the input images, and finally outputs a noise-reduced image (NR image) as an output of the addition processing section 107 shown in FIG. 5.

The local motion estimation processing section 102 receives a standard image and a reference image from the frame memory 101. The standard image is a target of a noise reduction process. The reference image is employed in the noise reduction process performed on the standard image. The reference image includes an image of the same subject as the subject captured in the standard image. The images may be images captured continuously, for example. The local motion estimation processing section 102 obtains an LMV from the standard image and the reference image.

As in the process performed by the image processing apparatus 10 described earlier with reference to FIG. 1, the image processing apparatus 100 shown in FIG. 5 also performs a noise reduction process on the standard image employing the reference images captured continuously before or after capturing the standard image, for example. First, one standard image and one reference image are employed to generate an NR image, which is stored in the frame memory 101. The NR image is used as a new standard image, and combined with a subsequent, second reference image so that a further noise reduction process is performed. The processes are repeated to generate and output a final NR image.

In the example described below, a plurality of reference images captured before capturing the standard image, which is a target of a noise reduction process, is applied to the standard image.

The local motion estimation processing section 102 receives a standard image and one reference image from the frame memory 101 to calculate an LMV employing the received images. For example, blocks in the reference image and corresponding blocks in the standard image are aligned with each other in units of small regions (blocks) defined by partitioning each image frame, for example, to output an LMV for each block. The LMV indicates the amount, direction, and so forth of motion of a subject between the standard image and the reference image in units of small regions (blocks).

A block matching method, for example, may be employed to detect the LMV. The block matching method includes dividing each small region (block) mentioned above into microblocks, calculating an absolute difference (AD) between pixel values of the standard image and the reference image for each microblock, and estimating a set of microblocks with a small AD as corresponding blocks. A vector connecting the corresponding blocks in the two images is determined as a motion vector.

The motion compensation processing section 103 performs motion compensation on the standard image or the reference image employing the LMV generated by the local motion estimation processing section 102 to generate an LMC image.

That is, in the generated LMC image, the subject in the standard image and the subject in the reference image have been moved and aligned with each other employing the LMV for each block. The motion compensation processing section 103 moves the subject in the reference image employing the LMV to generate an LMC image. The LMC image generated by the motion compensation processing section 103 is input to the MC image blend processing section 105.

The global motion estimation processing section 104 receives the reference image from the frame memory 101, and also receives the LMV for each block generated by the local motion estimation processing section 102.

The global motion estimation processing section 104 calculates one GMV corresponding to motion of the entire image between the standard image and the reference image on the basis of the input data to generate a GMC image in which the subject in the reference image has been moved employing the calculated GMV.

The global motion estimation processing section 104 performs a process to calculate a GMV from the LMVs for each block input from the local motion estimation processing section 102. The process may be achieved employing, for example, a technique disclosed in IEEE Transactions on Consumer Electronics, Vol. 52, No. 2, May 2006.

In the technique, LMVs with high reliability are selected from LMVs for each block, and one GMV is obtained through an averaging process or a least mean square method performed on the selected LMVs with high reliability.

Figures 6A, 6B:
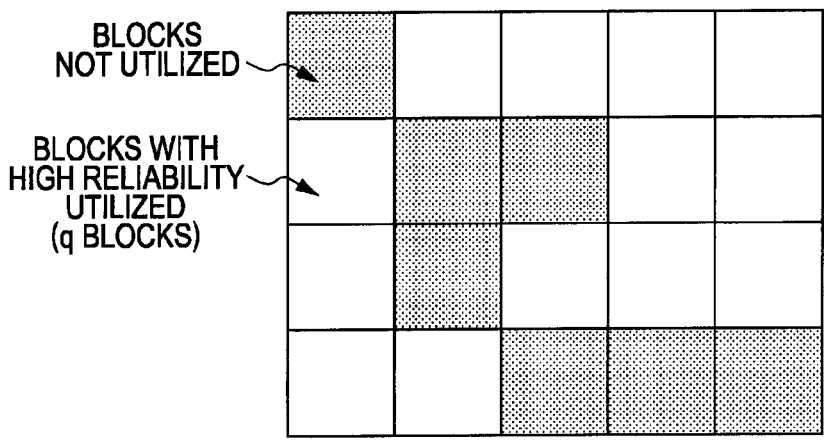
FIG. 6A illustrates an exemplary process for calculating a GMV from an LMV, showing an example in which setting as to whether to be utilized or not is made in units of blocks.
FIG. 6B illustrates an exemplary process for calculating a GMV from an LMV, showing an example in which a weight is set in units of blocks.

For example, as shown in FIG. 6A, in the case where p LMVs corresponding to a total of p blocks are obtained, q LMVs with high reliability are selected from the p LMVs. Consequently, one GMV is obtained on the basis of the q LMVs with high reliability without utilizing (p−q) LMVs with low reliability.

As information on the reliability of an LMV, information on whether or not clear characteristic point matching is achieved by blocking matching between the standard image and the reference image may be utilized, for example. As the technique to obtain one GMV on the basis of LMVs with high reliability, an averaging process or a least mean square method may be employed, for example.

Alternatively, as shown in FIG. 6B, it is also possible to set the weight to LMVs for each block in accordance with the reliability of the LMVs and set the contribution rate to the LMVs in accordance with the weight of the LMVs to obtain one GMV through an addition process according to the contribution rate of the LMVs.

As described above, the global motion estimation processing section 104 employs the LMVs to calculate a GMV, and employs the calculated GMV to generate a GMC image.

The GMV and the GMC image generated by the global motion estimation processing section 104 are input to the MC image blend processing section 105.

The MC image blend processing section 105 also receives the LMV generated by the local motion estimation processing section 102 and the LMC image generated by the motion compensation processing section 103. The MC image blend processing section 105 further receives the standard image from the frame memory 101.

The MC image blend processing section 105 utilizes the input data to generate a BMC image. A detailed configuration of and the process performed by the MC image blend processing section 105 are described with reference to FIG. 7 and so forth.

Figure 7:
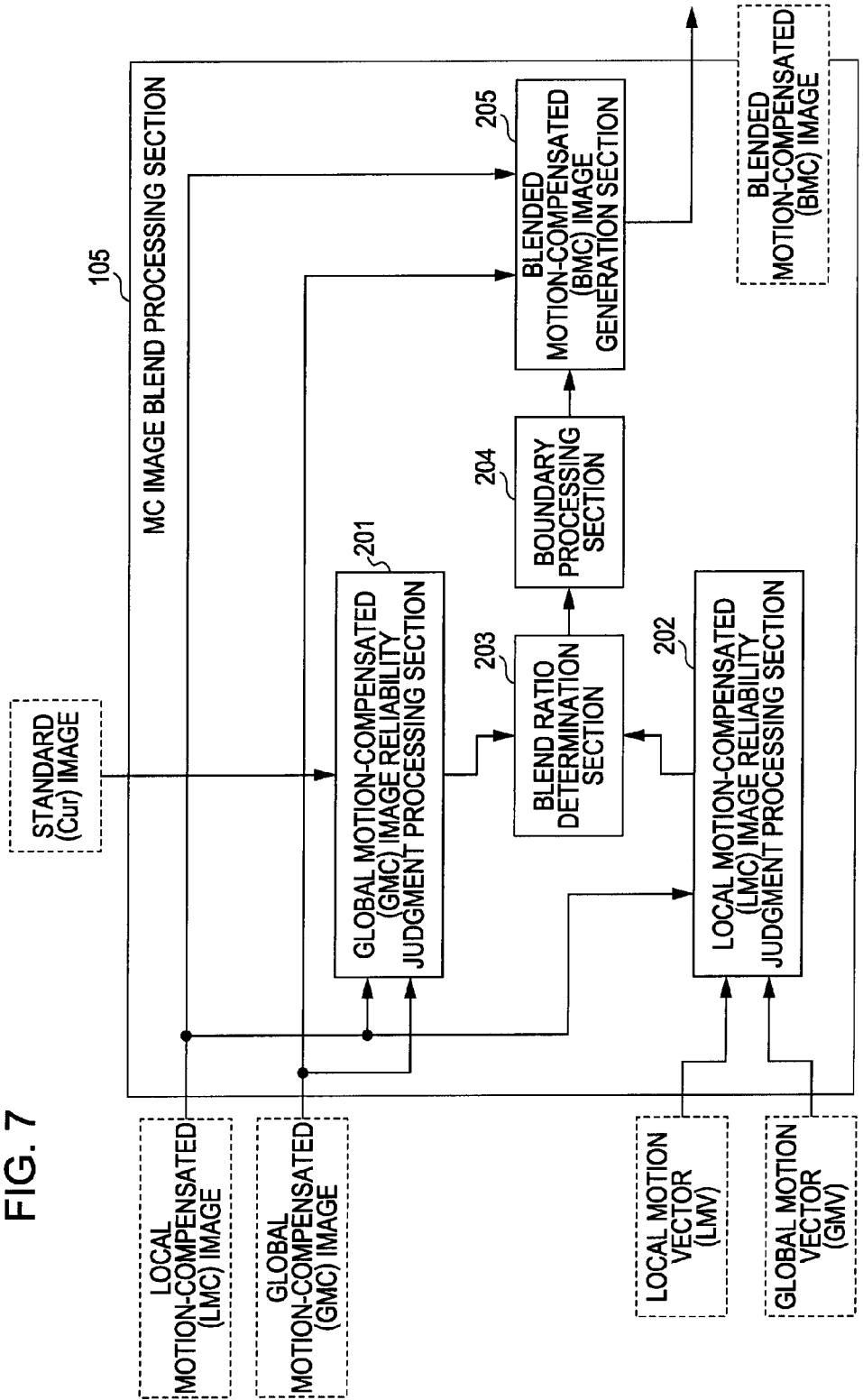
FIG. 7 illustrates an exemplary configuration of a motion-compensated (MC) image blend processing section of the image processing apparatus according to the embodiment of the present invention.

FIG. 7 shows a detailed configuration of the MC image blend processing section 105. The MC image blend processing section 105 includes a global motion-compensated (GMC) image reliability judgment section 201, a local motion-compensated (LMC) image reliability judgment section 202, a blend ratio determination section 203, a boundary processing section 204, and a blended motion-compensated (BMC) image generation section 205.

The GMC image reliability judgment section 201 calculates the reliability of the GMC image generated by the global motion estimation processing section 104 shown in FIG. 5. Specifically, the GMC image reliability judgment section 201 judges image regions indicating variations different from variations due to camera motion as regions in which the reliability of the GMC image is low, for example.

The LMC image reliability judgment section 202 calculates the reliability of the LMC images generated by the motion compensation processing section 103 shown in FIG. 5. Specifically, the LMC image reliability judgment section 202 verifies whether or not image regions indicating variations approximate to variations due to camera motion have a periodic pattern, for example. The GMC image reliability judgment section 201 and the LMC image reliability judgment section 202 calculate the reliability of each motion-compensated image in units of pixels or blocks. The process will be discussed in detail later.

The blend ratio determination section 203 receives information on the reliability of each motion-compensated image from the GMC image reliability judgment section 201 and the LMC image reliability judgment section 202 to determine the blend ratio between the GMC image and the LMC image in accordance with the received reliability information. The blend ratio is set in the unit in which the GMC image reliability judgment section 201 and the LMC image reliability judgment section 202 have calculated the reliability of each motion-compensated image, that is, in units of pixels or blocks, for example.

The boundary processing section 204 receives information on the blend ratio between the GMC image and the LMC image from the blend ratio determination section 203. The boundary processing section 204 readjusts the blend ratio to eliminate the unnaturalness of the connection at the boundary between regions, for example blocks, with different blend ratios. A specific exemplary process will be discussed later.

The BMC image generation section 205 receives information on the blend ratio readjusted by the boundary processing section 204 and blends the GMC image and the LMC image in accordance with the received blend ratio information to generate a BMC image. The generated BMC image is output to the addition determination section 106 and the addition processing section 107 shown in FIG. 5.

An exemplary configuration of and the process performed by the GMC image reliability judgment section 201 in the MC image blend processing section 105 shown in FIG. 7 are described with reference to FIG. 8.

Figure 8:
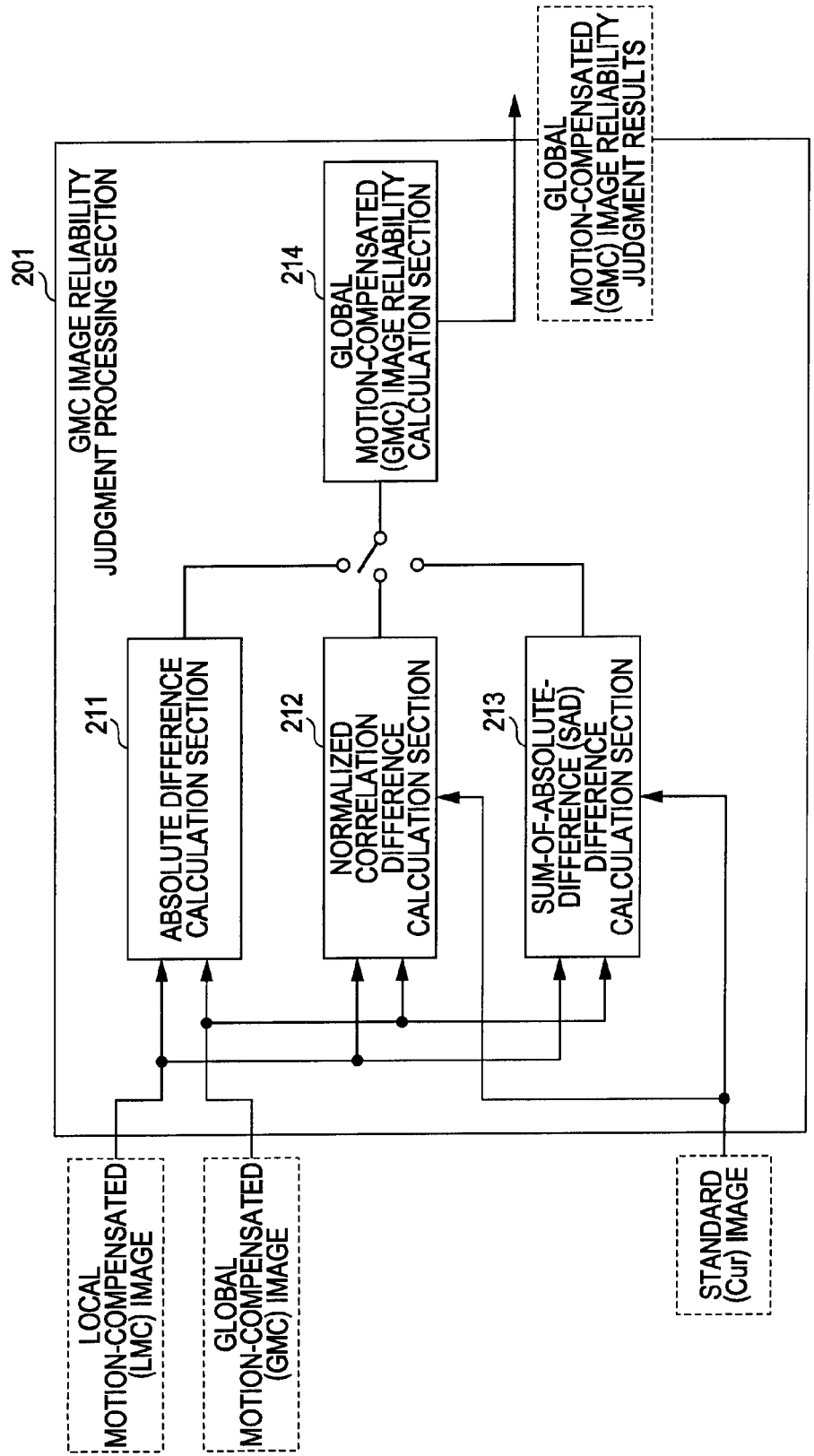
FIG. 8 illustrates an exemplary configuration of a global motion-compensated (GMC) image reliability judgment processing section of the image processing apparatus according to the embodiment of the present invention.

As shown in FIG. 8, the GMC image reliability judgment section 201 includes an absolute difference (AD) calculation section 211, a normalized correlation difference calculation section 212, a sum-of-absolute-difference (SAD) difference calculation section 213, and a global motion-compensated (GMC) image reliability calculation section 214.

Each of the AD calculation section 211, the normalized correlation difference calculation section 212, and the SAD difference calculation section 213 is capable of outputting information on the reliability of a GMC image by itself. Therefore, the reliability information from only one of the three sections may be utilized. Alternatively, the reliability information from the three sections may be utilized comprehensively. In the exemplary configuration shown in FIG. 8, three different reliability calculation techniques used by the three sections may be utilized selectively or comprehensively.

The AD calculation section 211 receives two motion-compensated images, namely the GMC image generated by the global motion estimation processing section 104 shown in FIG. 5 and the LMC image generated by the motion compensation processing section 103 shown in FIG. 5, to calculate an AD between the pixel values of the corresponding pixels in the GMC image and the LMC image. The process is performed in units of pixels to calculate the reliability of the GMC image in units of pixels.

The AD calculation section 211 calculates an AD between the pixel values of the corresponding pixels in the GMC image and the LMC image, for example an AD |Px(LMC)−Px(GMC)| between Px(GMC) and Px(LMC), to output the calculation results to the GMC image reliability calculation section 214.

The GMC image reliability calculation section 214 has a preset threshold T1, and compares the AD |Px(LMC)−Px(GMC)| between Px(GMC) and Px(LMC) input from the AD calculation section 211 with the threshold T1.

$$|Px(LMC) - Px(GMC)| > T1$$

If the above formula is satisfied, it is determined that the reliability of the pixels Px(GMC) forming the GMC image is low. If the above formula is not satisfied, it is determined that the reliability of the pixels Px(GMC) forming the GMC image is high.

The GMC image reliability calculation section 214 sets the reliability of each pixel to either of the following two values using the threshold T1, for example, as the boundary condition:

With reliability=(1)
Without reliability=(0)

The setting results are output to the blend ratio determination section 203.

The normalized correlation difference calculation section 212 receives two motion-compensated images, namely the GMC image generated by the global motion estimation processing section 104 shown in FIG. 5 and the LMC image generated by the motion compensation processing section 103 shown in FIG. 5, and also receives the standard (Cur) image as the target to be processed from the frame memory 101.

The normalized correlation difference calculation section 212 calculates the normalized correlation [NC(LMC, Cur)] between the LMC image and the Cur image using the following formula:

$$NC(LMC, Cur) = \Sigma_i(LMC(i) \times Cur(i))/\mathrm{Sqrt}(\Sigma i(LMC(i) \times LMC(i)) \times \Sigma_i(Cur(i) \times Cur(i)))$$

In the above formula, LMC(i) represents the pixel value of a pixel in a process block of the LMC image, Cur(i) represents the pixel value of a pixel in a process block of the Cur image, and sqrt represents a square root.

The normalized correlation difference calculation section 212 also calculates the normalized correlation [NC(GMC, Cur)] between the GMC image and the Cur image using the following formula:

$$NC(GMC, Cur) = \Sigma_i(GMC(i) \times Cur(i))/\mathrm{Sqrt}(\Sigma i(GMC(i) \times GMC(i)) \times \Sigma_i(Cur(i) \times Cur(i)))$$

In the above formula, GMC(i) represents the pixel value of a pixel in a process block of the GMC image, Cur(i) represents the pixel value of a pixel in a process block of the Cur image, and sqrt represents a square root.

The normalized correlation difference calculation section 212 further calculates the difference between NC(LMC, Cur) and NC(GMC, Cur) calculated using the above formulas as a normalized correlation difference given by:

$$NC(LMC, Cur) - NC(GMC, Cur)$$

The thus calculated normalized correlation difference is output to the GMC image reliability calculation section 214.

The GMC image reliability calculation section 214 has a preset threshold T2, and compares the normalized correlation difference [NC(LMC, Cur)−NC(GMC, Cur)] input from the normalized correlation difference calculation section 212 with the threshold T2.

$$NC(LMC, Cur) - NC(GMC, Cur) > T2$$

If the above formula is satisfied for a block, it is determined that the reliability of the GMC image is low for that block. If the above formula is not satisfied for a block, it is determined that the reliability of the GMC image is high for that block.

The GMC image reliability calculation section 214 sets the reliability of each block to either of the following two values using the threshold T2, for example, as the boundary condition:

With reliability=(1)
Without reliability=(0)

The setting results are output to the blend ratio determination section 203.

The SAD difference calculation section 213 receives two motion-compensated images, namely the GMC image generated by the global motion estimation processing section 104 shown in FIG. 5 and the LMC image generated by the motion compensation processing section 103 shown in FIG. 5, and also receives the Cur image as the target to be processed from the frame memory 101.

The SAD difference calculation section 213 calculates an SAD [SAD(LMC, Cur)] between the LMC image and the Cur image using the following formula:

$$SAD(LMC, Cur) = \Sigma_i(|LMC(i) - Cur(i)|)$$

In the above formula, LMC(i) represents the pixel value of a pixel in a process block of the LMC image, and Cur(i) represents the pixel value of a pixel in a process block of the Cur image.

The SAD difference calculation section 213 also calculates an SAD [SAD(GMC, Cur)] between the GMC image and the Cur image using the following formula:

$$SAD(GMC, Cur) = \Sigma_i(|GMC(i) - Cur(i)|)$$

In the above formula, GMC(i) represents the pixel value of a pixel in a process block of the GMC image, and Cur(i) represents the pixel value of a pixel in a process block of the Cur image.

The SAD difference calculation section 213 further calculates the difference between SAD(LMC, Cur) and SAD(GMC, Cur) calculated using the above formulas as an SAD difference given by:

$$SAD(LMC, Cur) - SAD(GMC, Cur)$$

The thus calculated SAD difference is output to the GMC image reliability calculation section 214.

The GMC image reliability calculation section 214 has a preset threshold T3, and compares the SAD difference [SAD(LMC, Cur)−SAD(GMC, Cur)] input from the SAD difference calculation section 213 with the threshold T3.

$$SAD(LMC, Cur) - SAD(GMC, Cur) > T3$$

If the above formula is satisfied for a block, it is determined that the reliability of the GMC image is low for that block. If the above formula is not satisfied for a block, it is determined that the reliability of the GMC image is high for that block.

The GMC image reliability calculation section 214 sets the reliability of each block to either of the following two values using the threshold T3, for example, as the boundary condition:

With reliability=(1)
Without reliability=(0)

The setting results are output to the blend ratio determination section 203.

As described earlier, each of the AD calculation section 211, the normalized correlation difference calculation section 212, and the SAD difference calculation section 213 shown in FIG. 8 is capable of outputting information on the reliability of a GMC image by itself. Therefore, the reliability information from only one of the three sections may be utilized. Alternatively, the reliability information from a plurality of the three sections may be input to the GMC image reliability calculation section 214 so that the GMC image reliability calculation section 214 comprehensively determines the information from the plurality of the sections to calculate the final reliability to be utilized.

Now, an exemplary configuration of and the process performed by the LMC image reliability judgment section 202 in the MC image blend processing section 105 shown in FIG. 7 are described with reference to FIG. 9.

Figure 9:
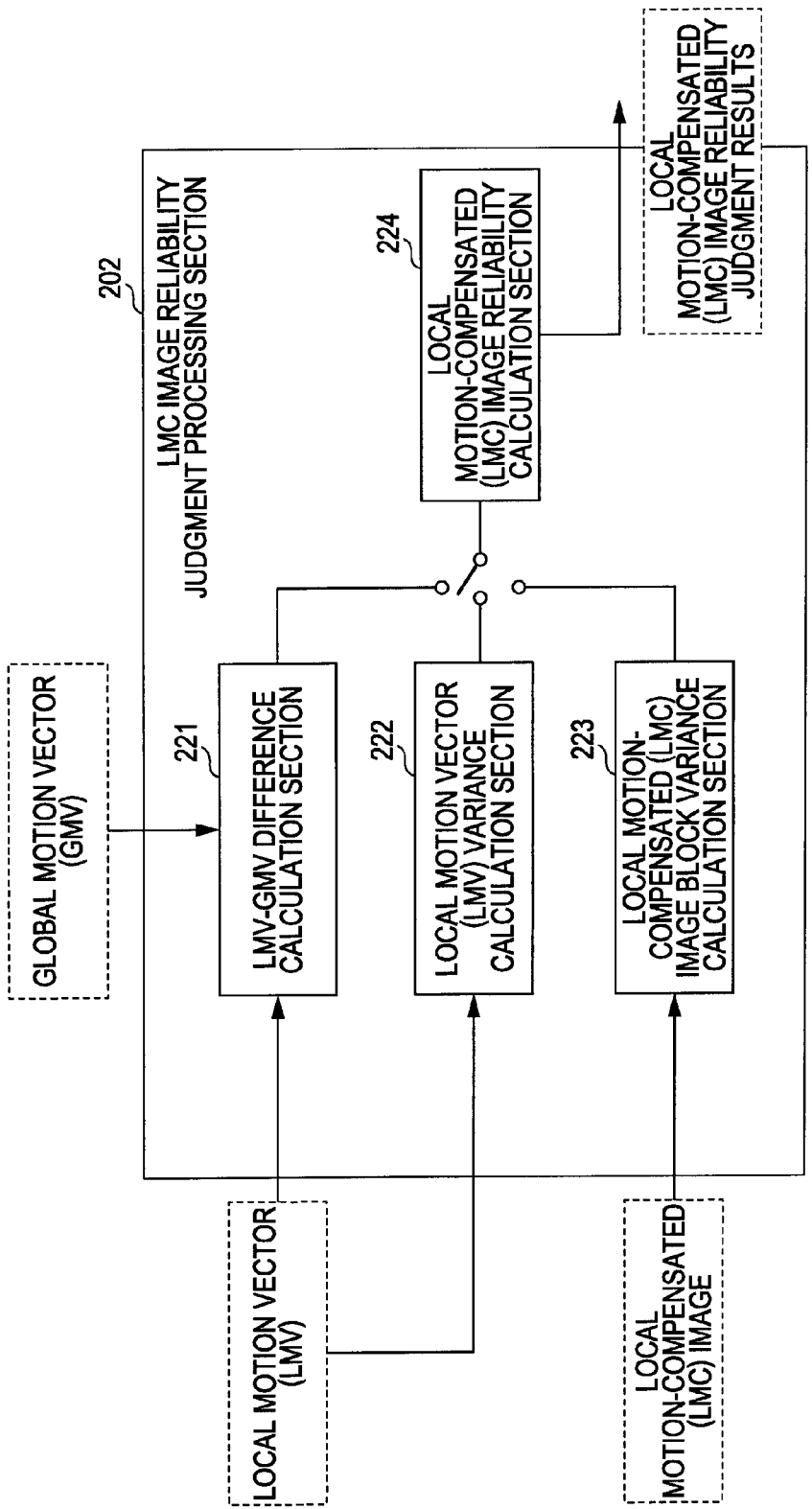
FIG. 9 illustrates an exemplary configuration of a local motion-compensated (LMC) image reliability judgment processing section of the image processing apparatus according to the embodiment of the present invention.

As shown in FIG. 9, the LMC image reliability judgment section 202 includes an LMV-GMV difference calculation section 221, a local motion vector (LMV) variance calculation section 222, a local motion-compensated (LMC) image block variance calculation section 223, and a local motion-compensated (LMC) image reliability calculation section 224.

In the configuration, also, each of the LMV-GMV difference calculation section 221, the LMV variance calculation section 222, and the LMC image block variance calculation section 223 is capable of outputting information on the reliability of an LMC image by itself. Therefore, the reliability information from only one of the three sections may be utilized. Alternatively, the reliability information from the three sections may be utilized comprehensively. In the exemplary configuration shown in FIG. 9, three different reliability calculation techniques used by the three sections may be utilized selectively or comprehensively.

The LMV-GMV difference calculation section 221 receives the GMV generated by the global motion estimation processing section 104 shown in FIG. 5 and the LMV generated by the local motion estimation processing section 102 shown in FIG. 5. The LMV-GMV difference calculation section 221 calculates the difference between the two vectors. The difference is calculated in units of blocks, in which the LMV has been set.

The LMV-GMV difference calculation section 221 calculates the LMV-GMV difference as given by:

$$|LMV-GMV|$$

The difference between the vectors may be calculated as a Euclidean distance, for example. The calculation results are output to the LMC image reliability calculation section 224.

The LMC image reliability calculation section 224 has a preset threshold T4, and compares the LMV-GMV difference input from the LMV-GMV difference calculation section 221 with the threshold T4.

$$|LMV-GMV|>T4$$

If the above formula is satisfied for a block, it is determined that the reliability of the LMC image is low for that block. If the above formula is not satisfied for a block, it is determined that the reliability of the LMC image is high for that block.

In the case where each motion vector is indicated by a vector component (x, y), if the component of an LMV is indicated as (LMV.x, LMV.y) and the component of a GMV is indicated as (GMV.x, GMV.y), the value |LMV−GMV| is represented by the following formula:

$$|LMV-GMV|=|LMV.x-GMV.x|+|LMV.y-GMV.y|$$

The LMV variance calculation section 222 shown in FIG. 9 receives the LMV generated by the local motion estimation processing section 102 shown in FIG. 5 to calculate an LMV variance [Var(neighboring LMV)].

A plurality of LMVs have been calculated in units of blocks. The LMV variance calculation section 222 analyzes the variance of the plurality of LMVs. That is, the degree of variance between one LMV corresponding to one block and a plurality of neighboring LMVs corresponding to blocks surrounding the block is calculated. The variance is referred to as [Var(neighboring LMV)].

A low LMV variance [Var(neighboring LMV)] means that similar LMVs are set to the plurality of blocks. In this case, it is determined that the reliability of an LMC image generated on the basis of the LMVs is low.

The neighboring reference blocks utilized by the LMV variance calculation section 222 to calculate the variance [Var(neighboring LMV)] may be set in various ways. The neighboring reference blocks may be set to blocks of 3 horizontal rows by 3 vertical columns or blocks or 3 horizontal rows by 1 vertical column centered on the block to be analyzed, for example.

The LMV variance calculation section 222 first calculates an average value [Ave($LMV_{ij}$)] of the LMVs in the variance calculation area in accordance with the formula below, in which ij is the identifier of a vector with i and j corresponding to the number in the x direction and in the y direction, respectively:

$$\text{Ave}(LMV_{ij})=(1/3\Sigma_k(LMV_{kj}.x), 1/3\Sigma_k(LMV_{kj}.y))$$

where k=[i−1, i, i+1].

The LMV variance calculation section 222 then calculates the LMV variance [Var(neighboring LMV)] in accordance with the following formula:

$$Var(\text{neighboring } LMV)=\text{sqrt}(1/3\Sigma_k((|LMV_{kj}.x-\text{Ave}(LMV_{ij}).x|+|LMV_{kj}.y-\text{Ave}(LMV_{ij}).y|)^2))$$

where k=[i−1, i, i+1], and sqrt represents a square root.

The LMV variance [Var(neighboring LMV)] calculated by the LMV variance calculation section 222 is output to the LMC image reliability calculation section 224.

The LMC image reliability calculation section 224 has a preset threshold T5, and compares the LMV variance [Var (neighboring LMV)] with the threshold T5.

$$Var(\text{neighboring } LMV)>T5$$

If the above formula is satisfied for a block, it is determined that the reliability of the LMC image is low for that block. If the above formula is not satisfied for a block, it is determined that the reliability of the LMC image is high for that block.

The LMC image block variance calculation section 223 shown in FIG. 9 receives the LMC image generated by the motion compensation processing section 103 shown in FIG. 5 to calculate an LMC image block variance [Var(LMC)].

The LMC image block variance calculation section 223 calculates the variance of the pixel values of pixels in a small region (block) set in an LMC image. The variance is small in the case of a flat image, for example. For such an image, the precision of LMVs themselves tends to be low, and thus it is determined that the reliability of an LMC image generated on the basis of the LMVs is low.

The LMC image block variance calculation section 223 calculates the LMC image block variance [Var(LMC)] in accordance with the formula below, in which (A) represents the block as the calculation target and [Var(LMC(A))] represents the LMC image block variance for the block A:

$$Var(LMC(A))=\text{sqrt}(Ave((A(i)-(AveA))^2))$$

where sqrt represents a square root, A(i) represents the pixel value of each pixel in the block A (with i indicating the pixel number), and AveA represents the average value of the pixel values of all the pixels in the block A.

The LMC image block variance [Var(LMC)] calculated by the LMC image block variance calculation section 223 is output to the LMC image reliability calculation section 224.

The LMC image reliability calculation section 224 has a preset threshold T6, and compares the LMC image block variance [Var(LMC)] with the threshold T6.

$$Var(LMC)<T6$$

If the above formula is satisfied for a block, it is determined that the reliability of the LMC image is low for that block. If the above formula is not satisfied for a block, it is determined that the reliability of the LMC image is high for that block.

As described earlier, each of the LMV-GMV difference calculation section 221, the LMV variance calculation section 222, and the LMC image block variance calculation section 223 shown in FIG. 9 is capable of outputting information on the reliability of an LMC image by itself. Therefore, the reliability information from only one of the three sections may be utilized. Alternatively, the reliability information from a plurality of the sections may be input to the LMC image reliability calculation section 224 so that the LMC image reliability calculation section 224 comprehensively determines the information from the plurality of the sections to calculate the final reliability to be utilized.

FIG. 10 shows an exemplary calculation of the final reliability of an LMC image that is performed utilizing the calculation results by the LMV-GMV difference calculation section 221 and the calculation results by the LMV variance calculation section 222, for example.

The calculation results by the LMV-GMV difference calculation section 221 are compared as given by:

$$|LMV-GMV|>T4$$

The above formula is either satisfied ((1) in FIG. 10) or not satisfied ((2) in FIG. 10).

The calculation results by the LMV variance calculation section 222 are compared as given by:

$$Var(\text{neighboring } LMV)>T5$$

The above formula is either satisfied ((a) in FIG. 10) or not satisfied ((b) in FIG. 10).

Thus, there are four combinations between the calculation results by the LMV-GMV difference calculation section 221 and the calculation results by the LMV variance calculation section 222.

Of the four combinations, only in the case where the combination in which the following formula is not satisfied ((2) in FIG. 10):

$$|LMV-GMV|>T4$$

and the following formula is not satisfied ((b) in FIG. 10):

$$Var(\text{neighboring } LMV)>T5$$

is satisfied, it is determined that the reliability of an LMC image for the relevant block is high.

While the final reliability of an LMC image is calculated utilizing the calculation results by the LMV-GMV difference calculation section 221 and the calculation results by the LMV variance calculation section 222 in the example shown in FIG. 10, the final reliability of an LMC image may be calculated utilizing other combinations of the calculation results. For example, information from all the three sections, namely the LMV-GMV difference calculation section 221, the LMV variance calculation section 222, and the LMC image block variance calculation section 223, may be utilized for the calculation.

Returning to FIG. 7, the description of the process performed by the MC image blend processing section 105 is resumed. As described with reference to FIG. 8, the GMC image reliability judgment processing section 201 calculates the reliability of GMC image to output information on the GMC image reliability to the blend ratio determination section 203. The reliability information has been calculated in units of pixels. Meanwhile, the LMC image reliability judgment processing section 202 calculates the reliability of the LMC image to output information on the LMC image reliability to the blend ratio determination section 203. The reliability information has been calculated in units of blocks.

The blend ratio determination section 203 determines the blend ratio (synthesis ratio) between the GMC image and the LMC image employing the two types of reliability information:
  GMC image reliability, and
  LMC image reliability.

The calculated blend ratio (synthesis ratio) between the GMC image and the LMC image is used to determine the pixel values of the pixels forming the BMC image.

Specifically, for example, the blend ratio of the GMC image is set to be in the range of 0 to 1 as follows.

(1) If the GMC image reliability is low, the GMC image blend ratio is set to 0.0.

(2) If the GMC image reliability is high and the LMC image reliability is low, the GMC image blend ratio is set to be between 0.6 and 1.0.

(3) If the GMC image reliability is high and the LMC image reliability is high, the GMC image blend ratio is set to be between 0.0 and 0.4.

When the GMC image blend ratio is 0.0, the pixel value of the relevant pixel is set to the pixel value of the LMC image. When the GMC image blend ratio is 1.0, the pixel value of the relevant pixel is set to the pixel value of the GMC image. When the GMC image blend ratio is 0.5, the pixel value of the relevant pixel is set to an intermediate value between the pixel value of the LMC image and the pixel value of the GMC image.

The pixel values of the pixels forming the BMC image are determined in accordance with the above settings. Information on the pixel values of the pixels forming the BMC image is then input to the boundary processing section 204 shown in FIG. 7.

The boundary processing section 204 executes a blend ratio adjustment process to eliminate the unnaturalness of the boundary portion between pixels with different blend ratios. For example, a pixel value smoothening process that employs a low-pass filter (LPF) is executed on the pixel values calculated in accordance with the blend ratios determined by the blend ratio determination section 203 to adopt the blend ratios calculated through the pixel value smoothening process.

Figure 11:
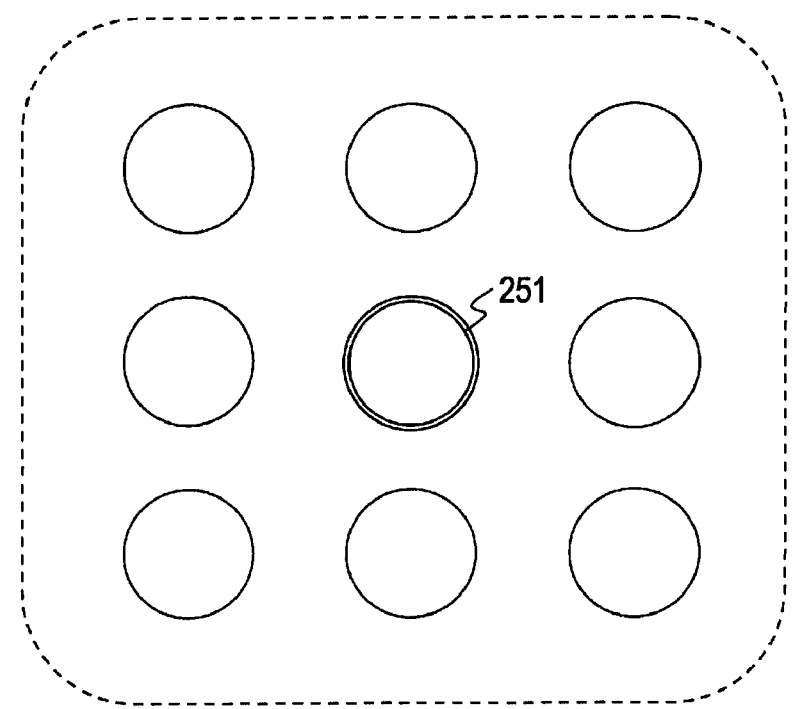
FIG. 11 illustrates an exemplary process performed by a boundary processing section of the image processing apparatus according to the embodiment of the present invention.

As shown in FIG. 11, 9 pixels (3 rows by 3 columns) centered on a pixel 251 as the target to be adjusted are selected, and the pixel value of the center pixel 251 is set to a value calculated using the following formula:

$$\text{Pixel value}=1/9(\Sigma Pv_i)$$

where $Pv_i$ is the pixel value of each of the 9 pixels (3 rows by 3 columns) centered on the pixel 251 as the target to be adjusted.

The blend ratios corresponding to the pixel values calculated through the process is used as the final blend ratios. The process smoothens variations in the pixel values to eliminate the unnaturalness of the boundary between pixels with different blend ratios in the GMC image and the LMC image to be contained in the BMC image.

The process results by the boundary processing section 204 shown in FIG. 7 are output to the BMC image generation section 205. The BMC image generation section 205 generates a BMC image with pixel values reflecting the process results by the boundary processing section 204.

Figure 12:
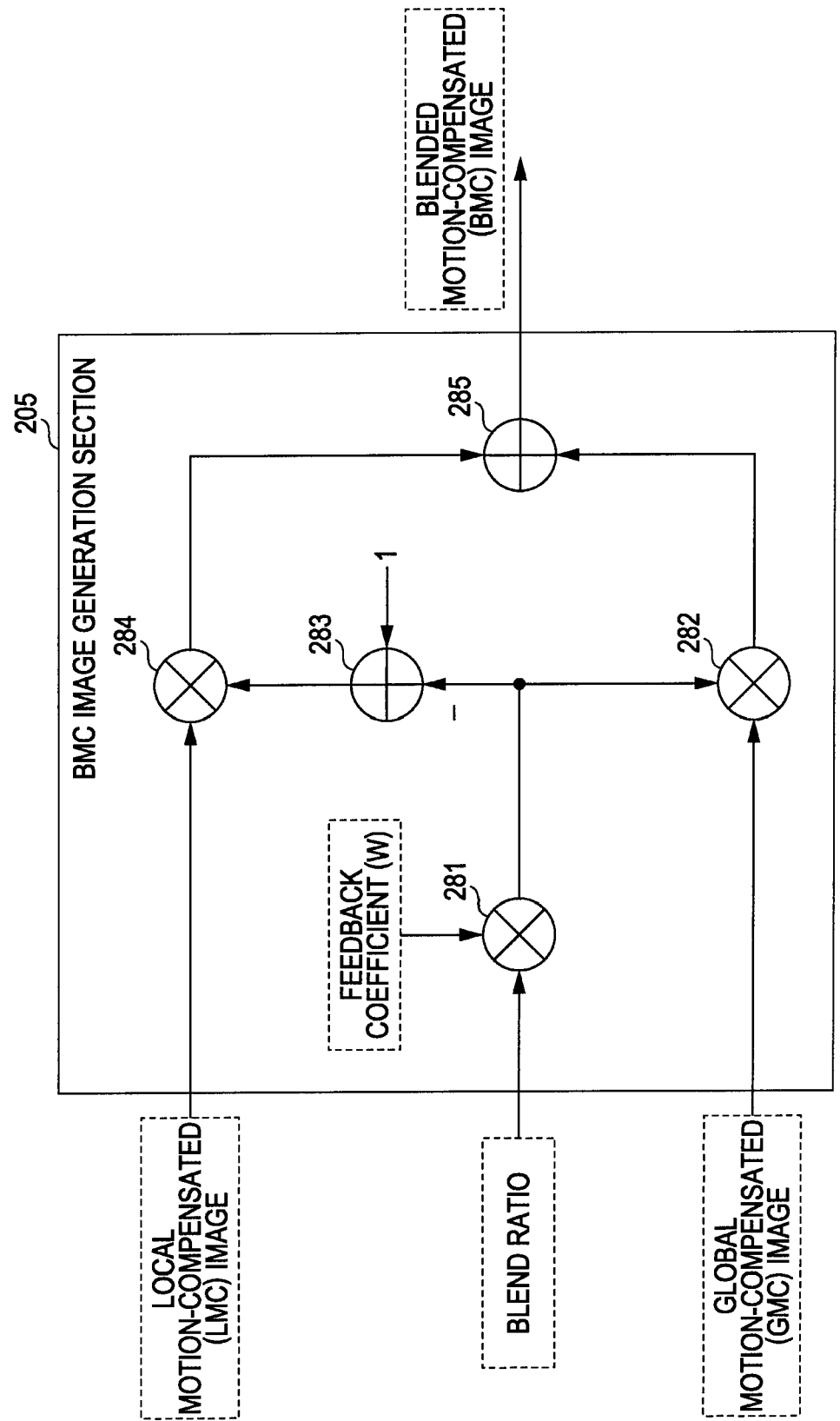
FIG. 12 illustrates an exemplary configuration of a blended motion-compensated (BMC) image generation section of the image processing apparatus according to the embodiment of the present invention.

An exemplary configuration of and the process performed by the BMC image generation section 205 are described with reference to FIG. 12. FIG. 12 shows one exemplary configuration of the BMC image generation section 205. The BMC image generation section 205 receives the LMC image generated by the motion compensation processing section 103 shown in FIG. 5, the GMC image generated by the global motion estimation processing section 104, and information on the blend ratios as the process results by the boundary processing section 204.

The process performed by the BMC image generation section 205 shown in FIG. 12 is described. A multiplier 281 multiplies the blend ratio information output from the boundary processing section 204 by a feedback coefficient (w). If the feedback rate is set to 1/3, for example, the weight of the GMC image in the weighted average varies in the range of 0 to 1/3 as the blend ratio varies in the range of 0 to 1. The feedback coefficient (w) may be input by a user, for example. Alternatively, a value that is automatically set in accordance with information on the image to be processed, for example the brightness (luminance) of a pixel, may be input as the feedback coefficient (w).

A coefficient (represented by α) output from the multiplier 281 is supplied to a multiplier 282 so that the GMC image is multiplied by the coefficient α.

The coefficient α is also supplied to a subtractor 283 to generate a value (1−α). The value (1−α) is supplied to a multiplier 284 so that the LMC image is multiplied by the value (1−α).

Outputs from the multipliers 282 and 284 are added by an adder 285 to generate a BMC image.

The BMC image generated by the BMC image generation section 205 is output to the addition determination section 106 and the addition processing section 107 as an output of the MC image blend processing section 105 as shown in FIG. 5, and utilized to generate an NR image.

Figure 13:
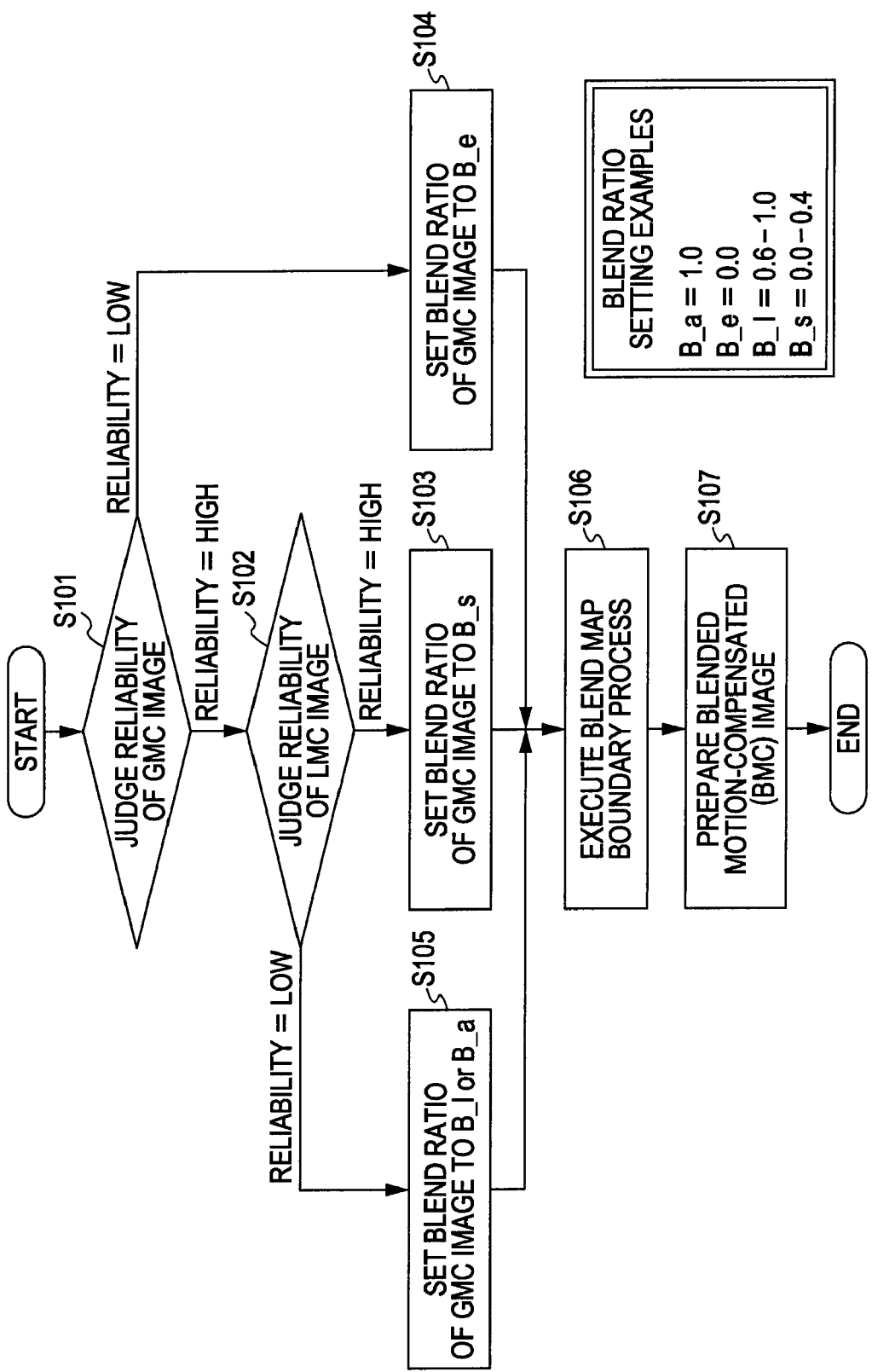
FIG. 13 is a flowchart illustrating the sequence of a process performed by the MC image blend processing section of the image processing apparatus according to the embodiment of the present invention.

The sequence of a process performed by the MC image blend processing section 105 is described with reference to the flowchart shown in FIG. 13. The process shown in the flowchart shown in FIG. 13 is performed by the MC image blend processing section 105 shown in FIG. 7.

In step S101, a GMC image reliability judgment process is executed by the GMC image reliability judgment section 201 shown in FIG. 7. The GMC image reliability judgment section 201 calculates the reliability of the GMC image generated by the global motion estimation processing section 104 shown in FIG. 5.

As described with reference to FIG. 8, the GMC image reliability judgment section 201 calculates the reliability of the GMC image on the basis of the values calculated by the AD calculation section 211, the normalized correlation difference calculation section 212, and the SAD difference calculation section 213, for example.

Specifically, the process determines image regions indicating variations different from variations due to camera motion as regions in which the reliability of the GMC image is low, for example. The reliability information is generated in units of pixels of the GMC image.

If it is determined in step S101 that the reliability of the GMC image for a pixel is low, the blend ratio of the GMC image for the pixel is set to B_e=0.0 in step S104. That is, the pixel value of the pixel is set to the pixel value of the LMC image. The process is performed by the blend ratio determination section 203 shown in FIG. 7.

If it is determined in step S101 that the reliability of the GMC image for a pixel is high, the pixel value is determined through the processes in step S102 and the subsequent steps.

In step S102, an LMC image reliability judgment process is executed by the LMC image reliability judgment section 202. The LMC image reliability judgment section 202 calculates the reliability of the LMC image generated by the motion estimation processing section 103 shown in FIG. 5. As described with reference to FIG. 9, the reliability of the LMC image is calculated on the basis of the values calculated by the LMV−GMV difference calculation section 221, the LMV variance calculation section 222, and the LMC image block variance calculation section 223, for example.

Specifically, the process verifies whether or not image regions indicating variations approximate to variations due to camera motion have a periodic pattern, and determines image regions with a periodic pattern as regions in which the reliability of the LMC image is low, for example. The reliability information is generated in units of blocks of the LMC image.

If it is determined in step S102 that the reliability of the LMC image for a block is low, the blend ratio of the GMC image for the pixels in the block is set to B_l=0.6 to 1.0 or B_a=1.0 in step S105. That is, the pixel value of the pixels is set to a pixel value that is between the pixel value of the LMC image and the pixel value of the GMC image and that is close to the pixel value of the GMC image.

If it is determined in step S102 that the reliability of the LMC image for a block is high, the blend ratio of the GMC image for the pixels in the block is set to B_s=0.0 to 0.4 in step S103. That is, the pixel value of the pixels is set to a value that is between the pixel value of the LMC image and the pixel value of the GMC image and that is close to the pixel value of the LMC image.

After the pixel values are set in steps S103 to S105, the process proceeds to step S106. The process in step S106 is performed by the boundary processing section 204 shown in FIG. 7. As described with reference to FIG. 11, the boundary processing section 204 adjusts the pixel values using an LPF of 3 rows by 3 columns, for example.

Then, in step S107, a BMC image is generated. The process is performed by the BMC image generation section 205 shown in FIG. 7.

The BMC image generation section 205 receives information on the blend ratio readjusted by the boundary processing section 204 and blends the GMC image and the LMC image in accordance with the received blend ratio information to generate a BMC image. As shown in FIG. 5, the generated BMC image is input to the addition determination section 106 and the addition processing section 107 shown in FIG. 5 as an output of the MC image blend processing section 105.

The addition determination section 106 receives the BMC image generated by the MC image blend processing section 105, the standard image, and image information for use in noise amount estimation (such as capturing conditions). The image information may be supplied from a microcomputer in a camera, for example. The image information includes the capturing mode, exposure time, gain, and so forth corresponding to the input images (captured images).

The addition determination section 106 generates an addition weight for use by the addition processing section 107 in units of pixels. The addition determination section 106 generates an addition weight of the BMC image in the range of 0 to 1 in units of pixels, for example. Specifically, the addition determination section 106 generates a map (addition map) in which information on the addition weight is set in units of pixels forming the image, for example. The addition weight indicates the reliability of the BMC image.

That is, the addition determination section 106 determines the accuracy of the motion compensation performed between the standard image and the BMC image, determines the reliability of the BMC image for pixels that reduce noise without causing degradation when the standard image and the BMC image are added to be high, and sets the addition weight of the BMC image to be high for the pixels. Basically, the reliability of the BMC image for pixels is determined to be higher as the pixel values of the corresponding pixels in the standard image and the BMC image are more similar. For such pixels, the addition weight of the BMC is set to be high.

That is, the addition determination section 106 determines the accuracy of the motion compensation performed between the standard image and the BMC image, and calculates the addition weight such that the addition ratio of the BMC image is higher for pixels with accurate motion compensation and hence with high reliability.

It is possible to reduce noise uncorrelated with time, for example, by adding pixels obtained by capturing an identical portion of an identical object of two images captured at different times. Thus, as the certainty of the correspondence of the identical portion of the identical object of the two images is higher, the reliability is higher. In other words, the reliability indicates whether noise is superimposed on identical images or on different images, and it is necessary, for a high-precision noise reduction process, that the addition weight be provided in as much correspondence to the amount of noise as possible. The addition weight generated by the addition determination section 106 is set to a value of 0 when the reliability is low and to a value of 1 when the reliability is high, for example.

The addition processing section 107 performs a process to add the standard image and the BMC image employing the addition weight calculated for each corresponding pixel. The addition processing section 107 performs the addition process by calculating a weighted average between the standard image and the BMC image.

Figure 14:
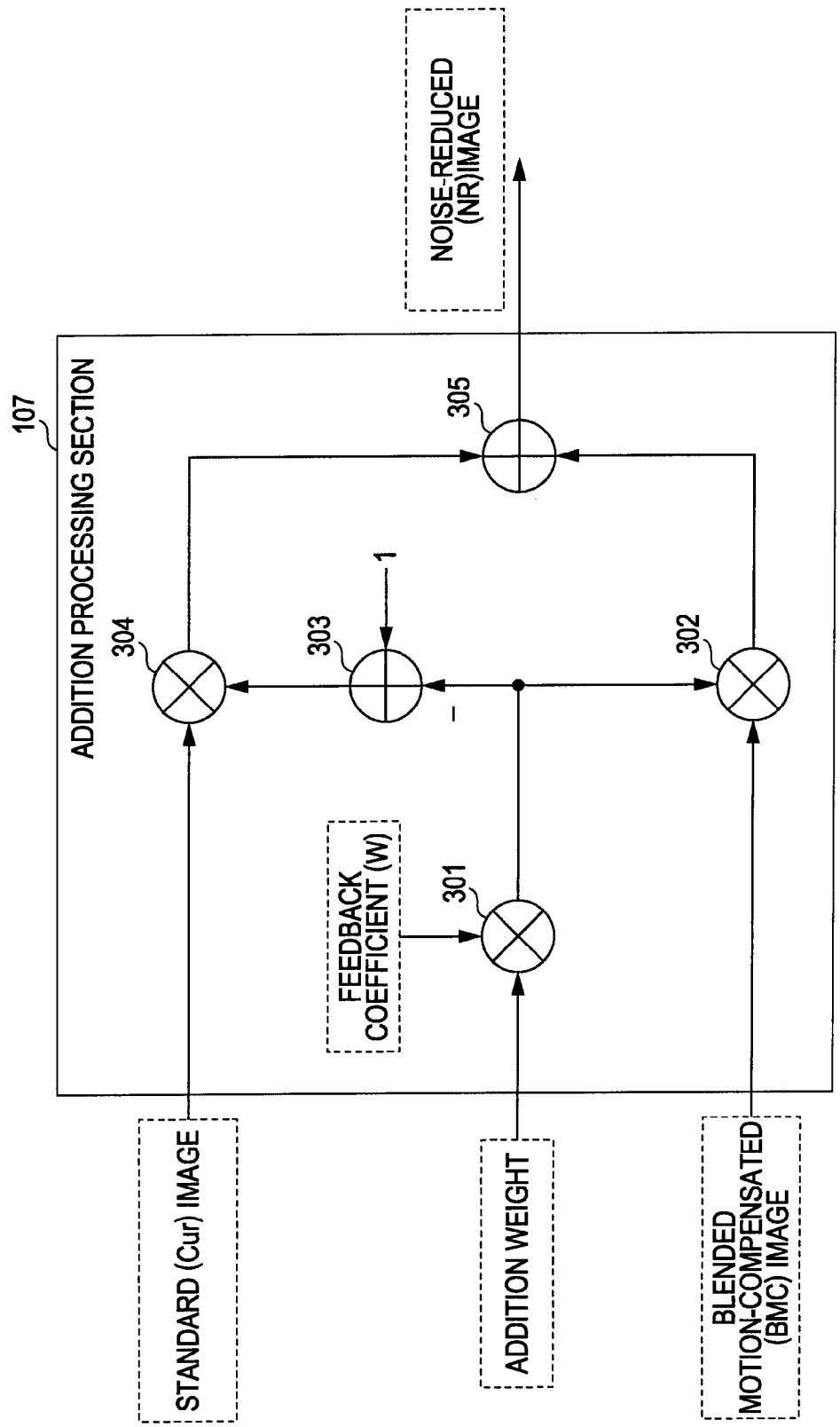
FIG. 14 illustrates an exemplary configuration of an addition processing section of the image processing apparatus according to the embodiment of the present invention.

An exemplary configuration of and the process performed by the addition processing section 107 are described with reference to FIG. 14. FIG. 14 shows an exemplary configuration of the addition processing section 107. As is understood from the drawing, the addition processing section 107 has generally the same configuration as the configuration of the BMC image generation section 205 described earlier with reference to FIG. 12.

The addition processing section 107 receives the BMC image generated by the MC image blend processing section 105 shown in FIG. 5, the standard image, and the addition weight information from the addition determination section 106.

A multiplier 301 multiplies the addition weight output from the addition processing section 107 by a feedback coefficient (w). If the feedback rate is set to 1/3, for example, the weight of the BMC image in the weighted average varies in the range of 0 to 1/3 as the addition weight varies in the range of 0 to 1.

A coefficient (represented by a) output from the multiplier 301 is supplied to a multiplier 302 so that the BMC image is multiplied by the coefficient α.

The coefficient a is also supplied to a subtractor 303 to generate a value (1−α). The value (1−α) is supplied to a multiplier 304 so that the Cur image is multiplied by the value (1−α).

Outputs from the multipliers 302 and 304 are added by an adder 305 to output an NR image.

The results of the addition of the standard image and the BMC image generated by the addition processing section 107, or the NR image, may be stored in the frame memory 101. The NR image may be used as a new standard image and combined with a new reference image so that the same process as discussed above is performed repeatedly.

After the process is performed a prescribed number of times, for example, the results of the addition of the standard image and the BMC image generated by the addition processing section 107 may be output as a final NR image.

Figure 15:
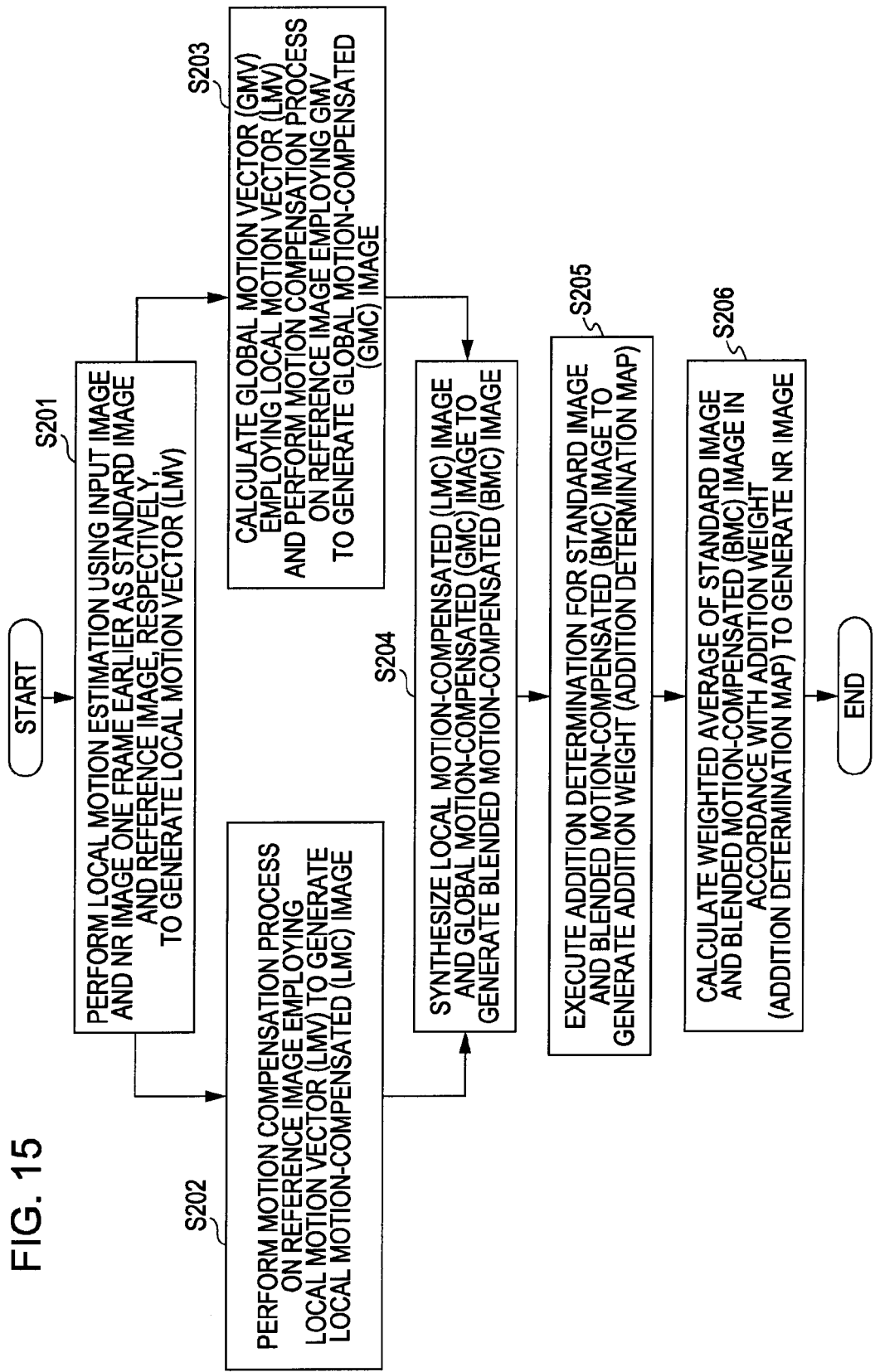
FIG. 15 is a flowchart illustrating the sequence of a process executed by the image processing apparatus according to the embodiment of the present invention.

The sequence of a process for generating an NR image executed by the image processing apparatus shown in FIG. 5 is described with reference to the flowchart shown in FIG. 15.

In step S201, local motion estimation is performed using the input image and the NR image one frame earlier as the standard image and the reference image, respectively, to generate an LMV. The process is executed by the local motion estimation processing section 102 shown in FIG. 5. For example, blocks in the reference image and corresponding blocks in the standard image are aligned with each other in units of small regions (blocks) defined by partitioning each image frame, for example, to generate an LMV for each block. The LMV indicates the amount and direction of motion of a subject between the standard image and the reference image in units of blocks.

Then, in step S202, a motion compensation process is performed on the reference image employing the LMV to generate an LMC image.

The process is performed by the motion compensation processing section 103 shown in FIG. 5. The motion compensation processing section 103 performs motion compensation on the standard image or the reference image employing the LMV generated by the local motion estimation processing section 102 to generate an LMC image.

In step S203, the LMV is employed to calculate a GMV, and a motion compensation process is performed on the reference image employing the GMV to generate a GMC image.

The process is performed by the global motion estimation processing section 104 shown in FIG. 5. The global motion estimation processing section 104 calculates one GMV corresponding to motion of the entire image between the standard image and the reference image on the basis of the input data to generate a GMC image in which the subject in the reference image has been moved employing the calculated GMV.

As described earlier with reference to FIG. 6A, the global motion estimation processing section 104 selects LMVs with high reliability from LMVs for each block, and obtains one GMV through an averaging process or a least mean square method performed on the selected LMVs with high reliability. Alternatively, as described with reference to FIG. 6B, the weight is set to LMVs for each block in accordance with the reliability of the LMVs and the contribution rate is set to the LMVs in accordance with the weight of the LMVs to obtain one GMV through an addition process according to the contribution rate of the LMVs.

Then, in step S204, the LMC image and the GMC image are employed to generate a BMC image. The process is performed by the MC image blend processing section 105 shown in FIG. 5.

As described earlier, the MC image blend processing section 105 has the configuration shown in FIG. 7. That is, the MC image blend processing section 105 includes a global motion-compensated (GMC) image reliability judgment section 201, a local motion-compensated (LMC) image reliability judgment section 202, a blend ratio determination section 203, a boundary processing section 204, and a blended motion-compensated (BMC) image generation section 205.

With the configuration shown in FIG. 7, the MC image blend processing section 105 calculates the reliability of the GMC image and the LMC image to determine pixel values in accordance with the reliability. The MC image blend processing section 105 also performs a process to smoothens the boundary portion between pixels to generate a BMC image.

Then, in step S205, addition determination for the standard image and the BMC image is executed to generate an addition weight (addition determination map). The process is performed by the addition determination section 106 shown in FIG. 5. The addition determination section 106 generates an addition weight for use by the addition processing section 107 in units of pixels. Specifically, the addition determination section 106 generates a map (addition map) in which information on the addition weight is set in units of pixels forming the image. The addition weight indicates the reliability of the BMC image. Basically, the reliability of the BMC image for pixels is determined to be higher as the pixel values of the corresponding pixels in the standard image and the BMC image are more similar. For such pixels, the addition weight of the BMC is set to be high.

Finally, in step S206, a weighted average between the standard image and the BMC image is calculated in accordance with the addition weight (addition determination map) to generate an NR image. The process is performed by the addition processing section 107 shown in FIG. 5.

The addition processing section 107 performs a process to add the standard image and the BMC image employing the addition weight calculated for each corresponding pixel. The addition processing section 107 performs the addition process by calculating a weighted average between the standard image and the BMC image.

In the case where an additional reference image is available, the new reference image may be applied to the image generated in step S206 to repeatedly execute the processes in step S201 and the subsequent steps.

(4) Exemplary Hardware Configuration of Image Processing Apparatus

Figure 16:
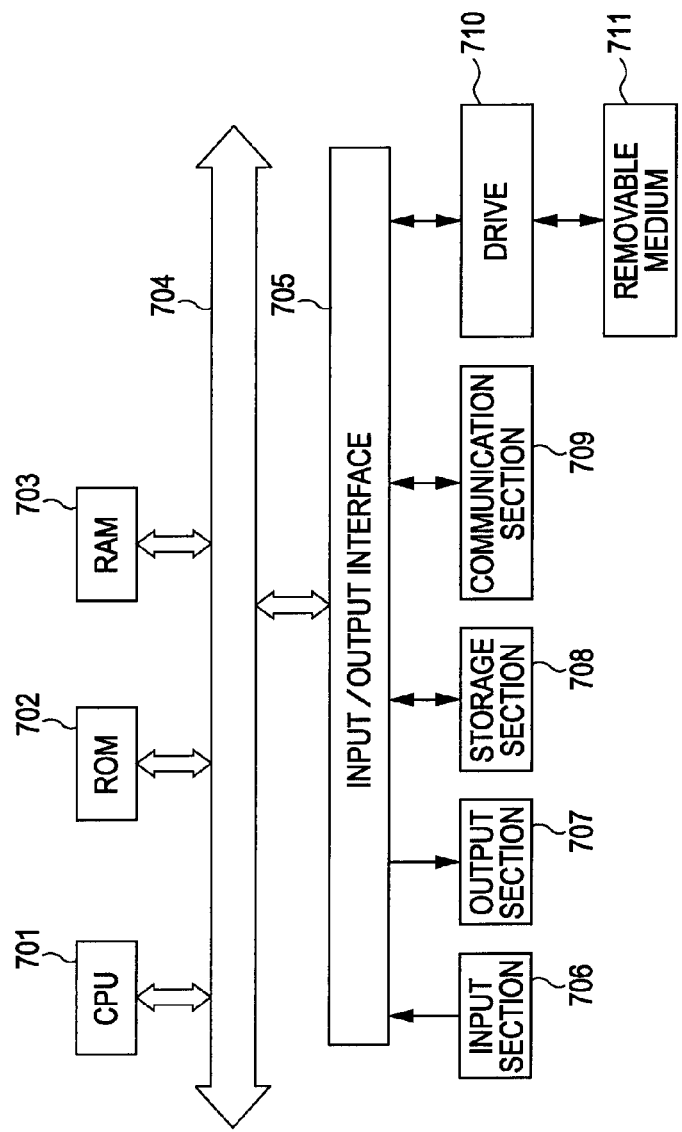
FIG. 16 illustrates an exemplary hardware configuration of the image processing apparatus according to the embodiment of the present invention.

Lastly, an exemplary hardware configuration of a personal computer as a part of the apparatus that executes the processes discussed above is described with reference to FIG. 16. A CPU (Central Processing Unit) 701 executes various processes in accordance with a program stored in a ROM (Read Only Memory) 702 or a storage section 708. For example, the CPU 701 executes a program for a process such as the process for generating an NR image described in the embodiment discussed above. A RAM (Random Access Memory) 703 appropriately stores a program executed by the CPU 701 and data. The CPU 701, the ROM 702, and the RAM 703 are connected to each other through a bus 704.

The CPU 701 is connected to an input/output interface 705 via the bus 704. To the input/output interface 705, an input section 706 such as a keyboard, a mouse, and a microphone and an output section 707 such as a display and a speaker are connected. The CPU 701 executes various processes in correspondence with a command input from the input section 706, and outputs the process results to the output section 707, for example.

The storage section 708 may be a hard disk drive, for example, and is connected to the input/output interface 705 to store a program executed by the CPU 701 and various data. A communication section 709 communicates with an external device via a network such the Internet or a LAN (Local Area Network).

A drive 710 is connected to the input/output interface 705, and drives a removable media 711 such as a magnetic disk, an optical disc, a magneto-optical disk, or a semiconductor memory to acquire a program or data stored in the removable media 711. The acquired program or data are transferred to and stored in the storage section 708 as necessary.

The present invention has been described above in detail with reference to specific embodiments of the present invention. It should be apparent, however, that those skilled in the art may modify or alter the embodiments without departing from the scope and spirit of the present invention. In other words, the present invention has been disclosed illustratively, and should not be construed as limitative. In order to judge the scope and spirit of the present invention, the appended claims should be referred to.

The series of processes described herein may be performed by means of hardware, software, or a combination thereof. In the case where the processes are performed by means of software, a program in which the sequence of processes is recorded may be installed on a memory in a computer incorporating dedicated hardware, or installed on a general-purpose computer capable of performing various processes. For example, the program may be stored in advance in a storage medium to be installed from the storage medium onto a computer. Alternatively, the program may be received via a network such as a LAN or the Internet to be installed onto an internal storage medium such as a hard disk drive.

The various processes disclosed herein may be executed chronologically in accordance with the order of description, or may be executed in parallel or individually depending on the processing capacity of the apparatus which executes the processes or as necessary. The term "system" as used herein refers to a logically integrated set of a plurality devices, and is not limited to a plurality devices accommodated in the same housing.

The present application contains subject matter related to that disclosed in Japanese Priority Patent Application JP 2008-325421 filed in the Japan Patent Office on Dec. 22, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a local motion estimation processing section that detects a local motion vector for each block forming an image from a standard image and a reference image;
a motion compensation processing section that executes motion compensation on the reference image employing the local motion vector to generate a local motion-compensated image;
a global motion compensation processing section that calculates a single global motion vector for the entire standard image and the entire reference image employing the local motion vector and that executes motion compensation on the reference image employing the calculated global motion vector to generate a global motion-compensated image; and a blend processing section that calculates respective reliabilities of the local motion-compensated image and the global motion-compensated image in units of image regions and that executes a process to synthesize pixel values of the local motion-compensated image and pixel values of the global motion-compensated image in accordance with the calculated reliabilities to generate a blended motion-compensated image.

2. The image processing apparatus according to claim 1, wherein the blend processing section includes a local motion-compensated image reliability judgment processing section that calculates the reliability of the local motion-compensated image, and the local motion-compensated image reliability judgment processing section is configured to calculate the reliability of the local motion-compensated image in units of blocks by calculating at least one of:

(a) a difference between the local motion vector and the global motion vector;

(b) a variance of the local motion vector; or (c) a variance of pixel values of pixels in a block of the local motion-compensated image.

3. The image processing apparatus according to claim 1, wherein the blend processing section includes a global motion-compensated image reliability judgment processing section that calculates the reliability of the global motion-compensated image, and the global motion-compensated image reliability judgment processing section is configured to calculate the reliability of the global motion-compensated image in units of pixels or predetermined regions by calculating at least one of:

(a) an absolute difference between pixels forming the local motion-compensated image and pixels forming the global motion-compensated image;

(b) a difference between normalized correlation between pixels forming the standard image and the pixels forming the local motion-compensated image and normalized correlation between the pixels forming the standard image and the pixels forming the global motion-compensated image; or (c) a difference between a sum of absolute difference between the pixels forming the standard image and the pixels forming the local motion-compensated image for each predetermined region and a sum of absolute difference between the pixels forming the standard image and the pixels forming the global motion-compensated image for each predetermined region.

4. The image processing apparatus according to any one of claims 1 to 3, wherein the blend processing section includes a blend ratio determination section that determines a blend ratio to be employed in the process to synthesize the pixel values of the local motion-compensated image and the pixel values of the global motion-compensated image, and the blend ratio determination section is configured to:

for pixels for which it is determined that the reliability of the global motion-compensated image is low, set the blend ratio of the global motion-compensated image to 0;

for pixels for which it is determined that the reliability of the global motion-compensated image is high and that the reliability of the local motion-compensated image is low, set the blend ratio of the global motion-compensated image to be relatively high; and for pixels for which it is determined that the reliability of the global motion-compensated image is high and that the reliability of the local motion-compensated image is high, set the blend ratio of the global motion-compensated image to be relatively low.

5. The image processing apparatus according to claim 4, wherein the blend processing section includes a boundary processing section that adjusts the blend ratio determined by the blend ratio determination section, and the boundary processing section is configured to calculate a blend ratio corresponding to pixel values calculated through a pixel value smoothening process in which a low-pass filter is applied to pixel values calculated in accordance with the blend ratio determined by the blend ratio determination section.

6. The image processing apparatus according to claim 5, wherein the blend processing section includes a blended motion-compensated image generation section that executes the process to synthesize the pixel values of the local motion-compensated image and the pixel values of the global motion-compensated image in accordance with the blend ratio calculated by the boundary processing section to generate the blended motion-compensated image.

7. The image processing apparatus according to claim 1, further comprising:

an addition processing section that performs a process to add the standard image and the blended motion-compensated image to generate a noise-reduced image in which noise deriving from the standard image has been reduced.

8. The image processing apparatus according to claim 7, further comprising:

an addition determination section that sets a weight of the blended motion-compensated image for use in the addition process executed by the addition processing section.

9. An image processing method used by an image processing apparatus to execute image processing, comprising the steps of:

detecting a local motion vector for each block forming an image from a standard image and a reference image;

executing motion compensation on the reference image employing the local motion vector to generate a local motion-compensated image;

calculating a single global motion vector for the entire standard image and the entire reference image employing the local motion vector and executing motion compensation on the reference image employing the calculated global motion vector to generate a global motion-compensated image; and calculating reliabilities of the local motion-compensated image and the global motion-compensated image in units of image regions and executing a process to synthesize pixel values of the local motion-compensated image and pixel values of the global motion-compensated image in accordance with the calculated reliabilities to generate a blended motion-compensated image.

10. A non-transitory computer-readable medium encoded with a program for causing an image processing apparatus to execute the steps of:

detecting a local motion vector for each block forming an image from a standard image and a reference image;

executing motion compensation on the reference image employing the local motion vector to generate a local motion-compensated image;

calculating a single global motion vector for the entire standard image and the entire reference image employing the local motion vector and execute motion compensation on the reference image employing the calculated global motion vector to generate a global motion-compensated image; and calculating reliabilities of the local motion-compensated image and the global motion-compensated image in units of image regions and execute a process to synthesize pixel values of the local motion-compensated image and pixel values of the global motion-compensated image in accordance with the calculated reliabilities to generate a blended motion-compensated image.

* * * * *